United States Patent
Xia et al.

(10) Patent No.: US 6,515,786 B1
(45) Date of Patent: Feb. 4, 2003

(54) BANDWIDTH VARIABLE WAVELENGTH ROUTER AND METHOD OF OPERATION

(75) Inventors: Tiejun Xia, Richardson, TX (US); Chi-Hao Cheng, Dallas, TX (US); Shuxin Li, Plano, TX (US); Jian-Yu Liu, Garland, TX (US); Kuang-Yi Wu, Plano, TX (US)

(73) Assignee: Chorum Technologies LP, Richardson, TX (US)

( * ) Notice: Subject to any disclaimer, the term of this patent is extended or adjusted under 35 U.S.C. 154(b) by 0 days.

(21) Appl. No.: 09/922,989

(22) Filed: Aug. 3, 2001

(51) Int. Cl.[7] .................................................. G02F 1/03
(52) U.S. Cl. ...................... 359/256; 359/117; 359/125; 359/246; 359/124; 359/121; 359/249
(58) Field of Search ................................ 359/251, 256, 359/249, 246, 124, 117, 121, 122, 128, 280, 281, 484, 494, 495

(56) References Cited

U.S. PATENT DOCUMENTS

| | | | |
|---|---|---|---|
| 3,391,970 A | 7/1968 | Sincerbox | 365/121 |
| 3,500,102 A | 3/1970 | Crost et al. | 313/483 |
| 3,719,414 A | 3/1973 | Wentz | 359/247 |
| 3,892,468 A | 7/1975 | Duguay | 385/4 |
| 3,920,983 A | 11/1975 | Schlafer et al. | 359/129 |
| 4,129,357 A | 12/1978 | Title | 359/497 |
| 4,227,208 A | 10/1980 | Takanashi et al. | 359/890 |
| 4,359,268 A | 11/1982 | Kondo | 359/247 |
| 4,461,543 A | 7/1984 | McMahon | 359/320 |
| 4,464,022 A | 8/1984 | Emkey | 359/484 |
| 4,514,046 A | 4/1985 | Carlsen et al. | 477/39 |
| 4,566,761 A | 1/1986 | Carlsen et al. | 359/495 |
| 4,575,193 A | 3/1986 | Greivenkamp, Jr. | 359/495 |
| 4,626,897 A | 12/1986 | Sato et al. | 348/273 |
| 4,650,289 A | 3/1987 | Kuwahara | 359/484 |
| 4,671,613 A | 6/1987 | Buhrer | 359/495 |
| 4,678,287 A | 7/1987 | Buhrer | 359/498 |
| 4,685,773 A | 8/1987 | Carlsen et al. | 359/495 |
| 4,744,075 A | 5/1988 | Buhrer | 359/133 |
| 4,745,591 A | 5/1988 | Foley | 359/133 |
| 4,772,104 A | 9/1988 | Buhrer | 359/497 |
| 4,919,522 A | 4/1990 | Nelson | 359/246 |
| 4,987,567 A | 1/1991 | Buhrer | 359/127 |
| 5,009,477 A | 4/1991 | Alferness et al. | 385/17 |
| 5,033,830 A | 7/1991 | Jameson | 356/453 |
| 5,040,896 A | 8/1991 | Moslehi | 356/453 |
| 5,111,321 A | 5/1992 | Patel | 349/198 |
| 5,204,771 A | 4/1993 | Koga | 359/281 |
| 5,231,521 A | 7/1993 | Johnson et al. | 349/18 |
| 5,243,455 A | 9/1993 | Johnson et al. | 349/18 |
| 5,262,892 A | 11/1993 | Nakamura | 359/484 |
| 5,274,679 A | 12/1993 | Abe et al. | 375/370 |

(List continued on next page.)

FOREIGN PATENT DOCUMENTS

| | | | |
|---|---|---|---|
| JP | 61-97629 | 5/1986 | G02F/1/31 |
| JP | 1140134 | 6/1989 | G02F/1/31 |
| JP | 2007026 | 1/1990 | G02F/1/31 |
| JP | 3276119 | 12/1991 | G02F/27/28 |
| JP | 4128715 | 4/1992 | G02F/1/09 |
| JP | 6-181352 | 6/1994 | G02F/1/35 |

*Primary Examiner*—Georgia Epps
*Assistant Examiner*—M. Hasan
(74) *Attorney, Agent, or Firm*—Baker Botts L.L.P.

(57) ABSTRACT

An optical device comprises a first birefringent crystal having a first length, a second birefringent crystal having a second length, and a dynamic polarization rotator. An optical signal propagating through the first and second birefringent crystals has an effective optical path length based, at least in part, upon the first length of the first birefringent crystal and the second length of the second birefringent crystal. The dynamic polarization rotator adjusts the effective optical path length of the optical signal in response to a control signal.

50 Claims, 9 Drawing Sheets

U.S. PATENT DOCUMENTS

| | | | |
|---|---|---|---|
| 5,299,056 A | 3/1994 | Kurata et al. | 359/341.1 |
| 5,317,655 A | 5/1994 | Pan | 385/11 |
| 5,319,483 A | 6/1994 | Krasinski et al. | 359/113 |
| 5,341,444 A | 8/1994 | Henry et al. | 385/11 |
| 5,345,174 A | 9/1994 | Kimmich et al. | 324/309 |
| 5,351,317 A | 9/1994 | Weber | 385/3 |
| 5,355,249 A | 10/1994 | Souda et al. | 359/341.1 |
| 5,414,540 A | 5/1995 | Patel et al. | 349/196 |
| 5,444,725 A | 8/1995 | Zirngibl | 372/20 |
| 5,463,493 A | 10/1995 | Shah | 359/312 |
| 5,481,402 A | 1/1996 | Cheng et al. | 359/498 |
| 5,499,132 A | 3/1996 | Tojo et al. | 359/281 |
| 5,574,596 A | 11/1996 | Cheng | 359/484 |
| 5,579,420 A | 11/1996 | Fukushima | 385/11 |
| 5,596,661 A | 1/1997 | Henry et al. | 385/24 |
| 5,600,742 A | 2/1997 | Zirngibl | 385/37 |
| 5,619,359 A | 4/1997 | Redmond et al. | 359/117 |
| 5,680,490 A | 10/1997 | Cohen et al. | 385/24 |
| 5,694,233 A | 12/1997 | Wu et al. | 359/117 |
| 5,710,655 A | 1/1998 | Rumbaugh et al. | 359/249 |
| 5,718,226 A | 2/1998 | Riza | 600/437 |
| 5,724,165 A | 3/1998 | Wu | 359/117 |
| 5,729,377 A | 3/1998 | Bergmann | 359/249 |
| 5,751,384 A | 5/1998 | Sharp | 349/18 |
| 5,771,120 A | 6/1998 | Bergmann | 359/484 |
| 5,781,293 A | 7/1998 | Padgett et al. | 356/453 |
| 5,867,291 A | 2/1999 | Wu et al. | 359/124 |
| 5,923,472 A | 7/1999 | Bergmann | 359/618 |
| 5,930,028 A | 7/1999 | Bergmann | 359/303 |
| 5,930,039 A | 7/1999 | Li et al. | 359/484 |
| 6,002,512 A | 12/1999 | Bergmann et al. | 359/281 |
| 6,040,942 A | 3/2000 | Bergmann | 359/487 |
| 6,055,101 A | 4/2000 | Bergmann et al. | 359/484 |
| 6,067,178 A | 5/2000 | Zheng | 359/124 |
| 6,091,543 A | 7/2000 | Bergmann | 359/495 |
| 6,097,517 A | 8/2000 | Okayama | 359/124 |
| 6,097,518 A * | 8/2000 | Wu et al. | 359/128 |
| 6,125,221 A | 9/2000 | Bergmann et al. | 385/33 |
| 6,130,971 A | 10/2000 | Cao | 385/31 |
| 6,134,031 A | 10/2000 | Nishi et al. | 359/15 |
| 6,173,092 B1 | 1/2001 | Bergmann | 385/16 |
| 6,335,830 B1 * | 1/2002 | Chang et al. | 359/498 |

* cited by examiner

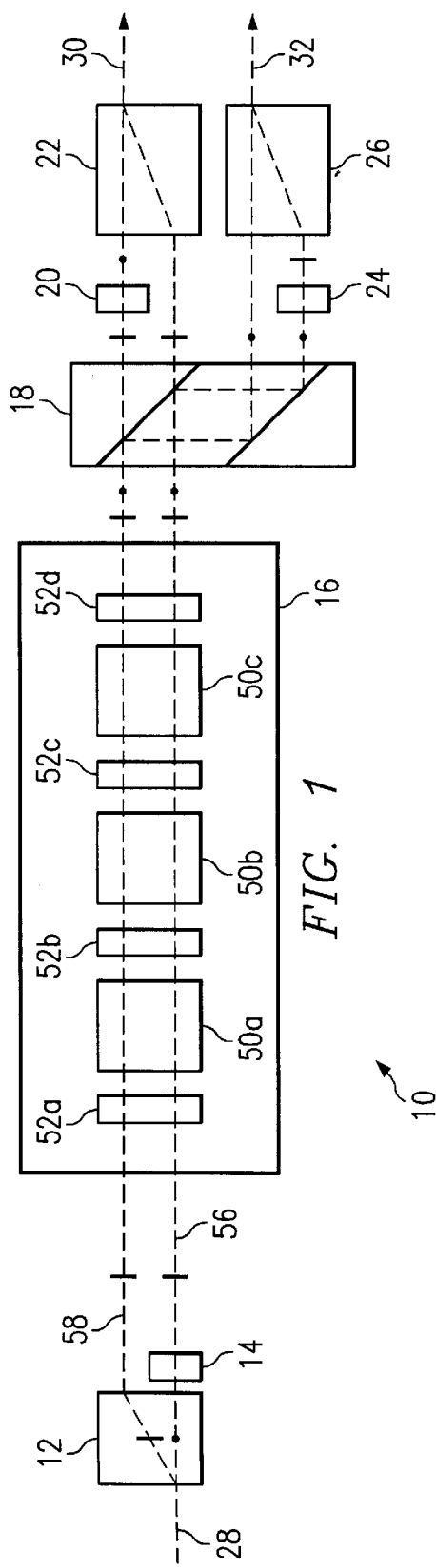
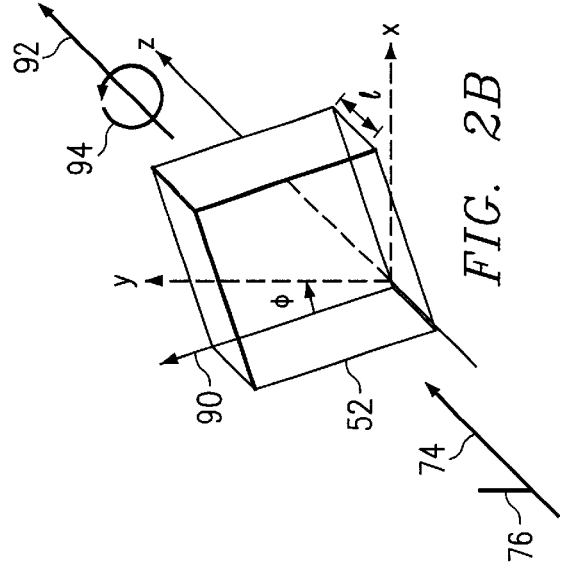
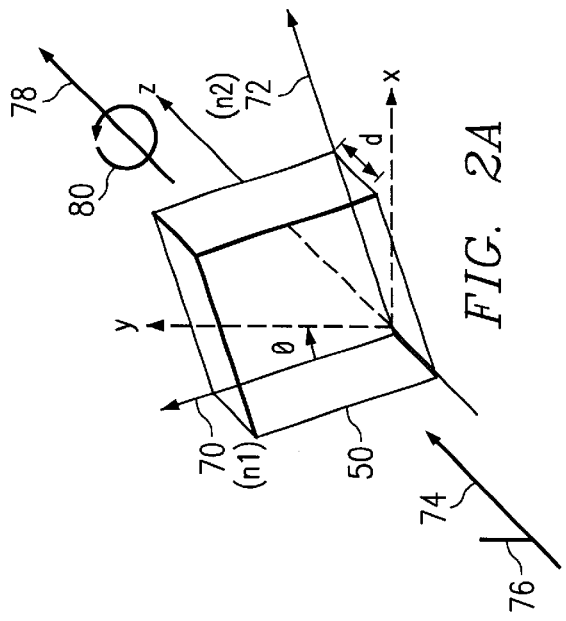
FIG. 1
FIG. 2A
FIG. 2B

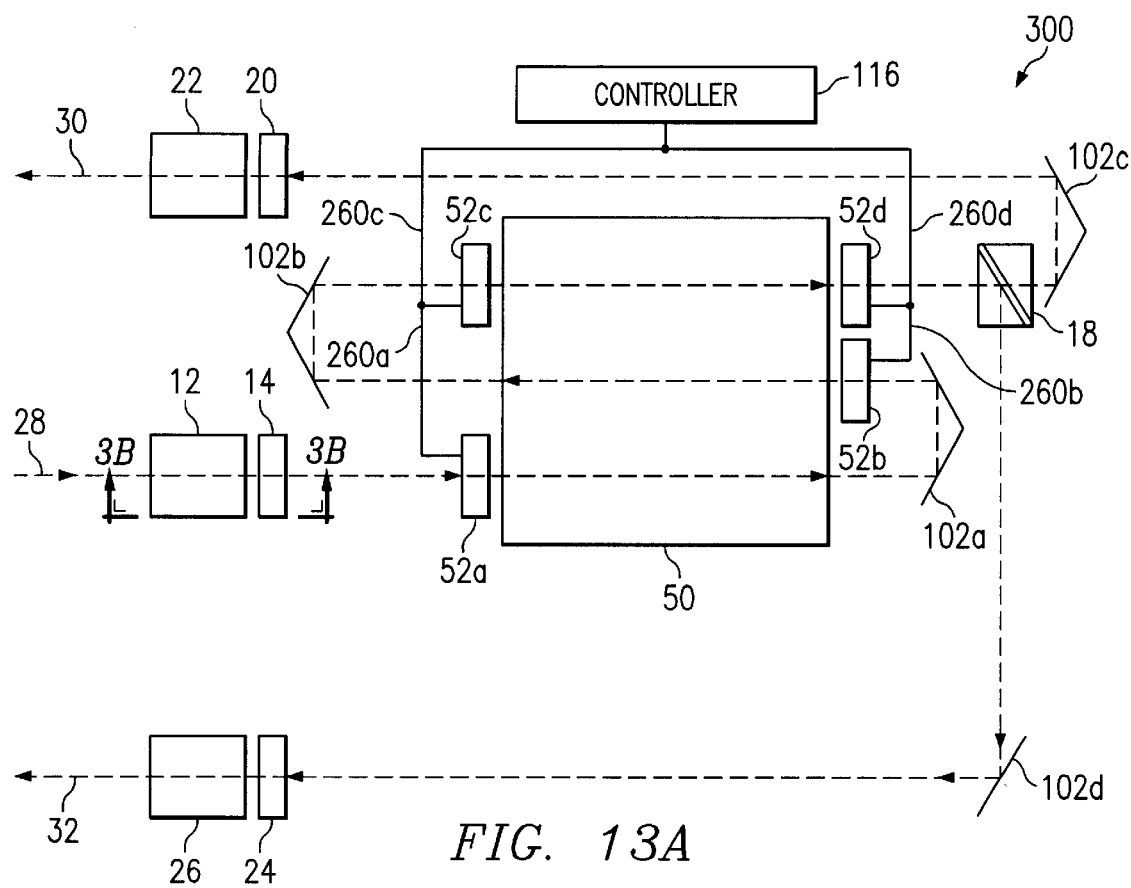
FIG. 13A
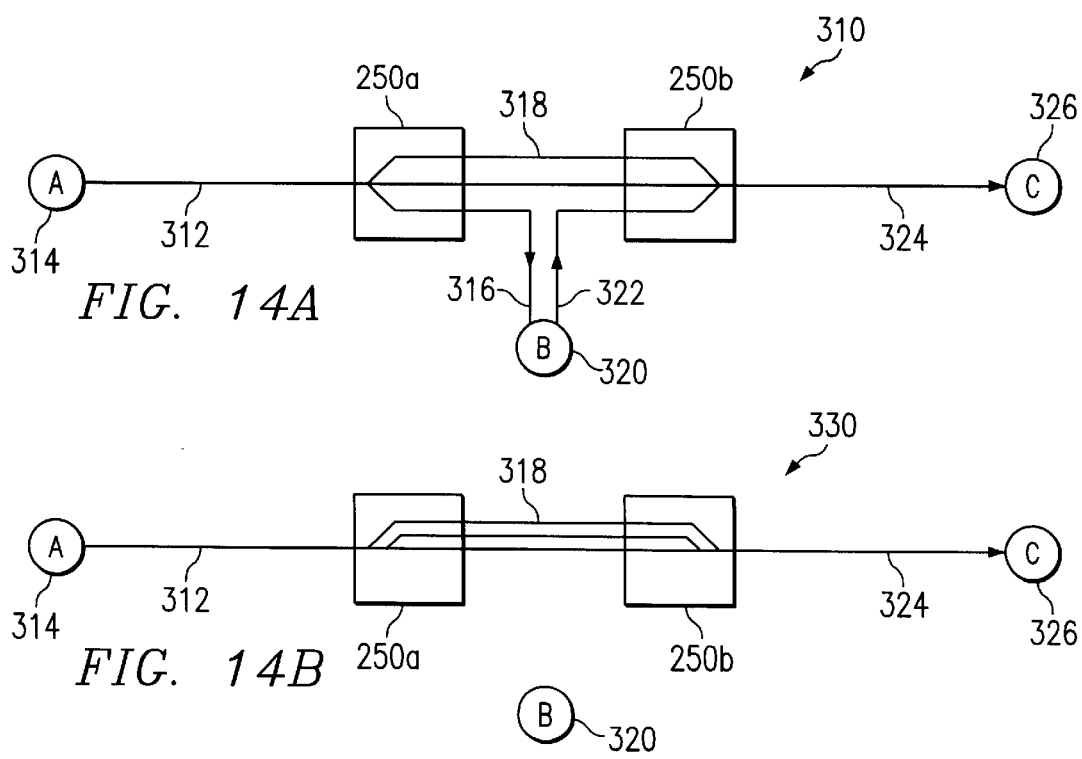
FIG. 14A
FIG. 14B

BANDWIDTH VARIABLE WAVELENGTH ROUTER AND METHOD OF OPERATION

RELATED APPLICATIONS

This application and copending application Ser. No. 09/922,467, entitled "Switchable Wavelength Router and Method of Operation", filed on Aug. 3, 2001; and copending application Ser. No. 09/922,999, entitled "Wavelength Router and Method of Operation", filed on Aug. 3, 2001 share portions of a common specification. These applications have been commonly assigned to Chorum Technologies LP.

TECHNICAL FIELD OF THE INVENTION

The present invention relates to optical communication systems, and more particular, to a bandwidth variable wavelength router.

BACKGROUND OF THE INVENTION

A wavelength router has applications in wavelength division multiplexed (WDM) optical networking environments. Prior designs for wavelength routers based upon polarization based techniques are often difficult to manufacture, provide static spectral processing, and are not effective in multi-bit-rate networking environments.

SUMMARY OF THE INVENTION

In one embodiment of the present invention, an optical device comprises a plurality of birefringent waveplates and a plurality of polarization rotators. The birefringent waveplates are oriented at a substantially common angle about an optical axis. The polarization rotators are arranged among the plurality of birefringent waveplates such that a wavelength division multiplexed optical signal propagating through the polarization rotators and the birefringent waveplates is processed into a first subset of wavelengths comprising substantially a first polarization and a second subset of wavelengths comprising substantially a second polarization.

In another embodiment of the present invention, an optical device comprises a first birefringent crystal having a first length, a second birefringent crystal having a second length, and a dynamic polarization rotator. An optical signal propagating through the first and second birefringent crystals has an effective optical path length based, at least in part, upon the first length of the first birefringent crystal and the second length of the second birefringent crystal. The dynamic polarization rotator adjusts the effective optical path length of the optical signal in response to a control signal.

In yet another embodiment of the present invention, an optical device comprises a plurality of birefringent waveplates and a plurality of polarization rotators. The polarization rotators are arranged among the plurality of birefringent waveplates such that an optical signal propagating through the polarization rotators and the birefringent waveplates is processed into a first subset of wavelengths comprising substantially a first polarization and a second subset of wavelengths comprising substantially a second polarization. At least one of the plurality of polarization rotators is operable to change the polarization state of beam components associated with the optical signal.

Some, none, or all of the embodiments described herein may embody some, none, or all of the advantages described herein. Manufacturing birefringent crystals or waveplates having unique angles, as with prior art wavelength routers, is a delicate process. An advantage provided by at least one embodiment of the present invention is that the birefringent waveplates are all arranged at a substantially common angle, (e.g., approximately zero degrees) with respect to a reference optical axis. In this respect, the cost and complexity associated with manufacturing and arranging the birefringent waveplates is reduced. For example, a designer is free to choose any common angle for all of the birefringent waveplates. As a result, angles near vulnerable cleavage planes, which induce chipping or cracking, can be readily avoided. Damage and waste are further reduced through efficient raw material utilization. For example, because all birefringent crystals are cut at a substantially common angle, an angle can be selected which results in the best yield.

Not only do the principles of the present invention advantageously reduce complexity and enhance flexibility of design and fabrication as described above, they facilitate a compact single piece waveplate implementation of a wavelength router. For example, because the birefringent waveplates may be oriented at a substantially common angle, it becomes possible to replace multiple longitudinally aligned individual birefringent waveplates with fewer waveplates arranged with the polarization rotators in a compact assembly that uses an optical beam path that is folded. In one embodiment, the multiple birefringent waveplates may be replaced by a single birefringent waveplate oriented at an angle. The compact size of the wavelength router results in higher optical device densities and a robust operation.

In a particular embodiment of the present invention, the spectral bandwidth of the wavelength channels associated with output signals is made variable in response to control signals applied to portions of the birefringent waveplates. By implementing the birefringent waveplates using a dynamic polarization rotator positioned between birefringent crystals, the effective optical path length propagating through the birefringent waveplate can be increased or decreased. By increasing the optical path length of an optical signal, the bandwidth of each wavelength channel associated with the output signals is narrowed. By decreasing the optical path length of an optical signal, the bandwidth of each wavelength channel associated with the output signals is widened. As a result, the use of a dynamic polarization rotator to control the effective path length of an optical signal facilitates variable bandwidth wavelength routing.

In another embodiment of the present invention, dynamic polarization rotators may be operated by the application of control signals to produce a switchable wavelength router. A technical advantage of a switchable wavelength router is that it provides a switchable beam path control in optical network applications. This allows the switchable wavelength router to function as an optical wavelength router in an optical network and to perform, for example, protection switching and restoration of optical data paths. Additionally, it can recognize new wavelength bands and switch subsets of wavelength channels among outputs.

Other technical advantages of the present invention will be readily apparent to one skilled in the art from the following figures, description and claims.

BRIEF DESCRIPTION OF THE DRAWINGS

For a more complete understanding of the present invention, and for further features and advantages thereof, reference is now made to the following description taken in conjunction with the accompanying drawings, in which:

FIG. 1 illustrates one embodiment of a wavelength router;

FIG. 2A is a perspective diagram illustrating an angle of cutting or rotation of an exemplary birefringent crystal;

FIG. 2B is a perspective diagram illustrating an angle of cutting or rotation of an exemplary polarization rotator having an optical axis;

FIGS. 13A–13B illustrate still another embodiment of a wavelength router; and

FIGS. 14A–14B illustrate one example application of switchable wavelength routers to facilitate first and second optical communication traffic patterns.

DETAILED DESCRIPTION OF THE DRAWINGS

Figure 3A:
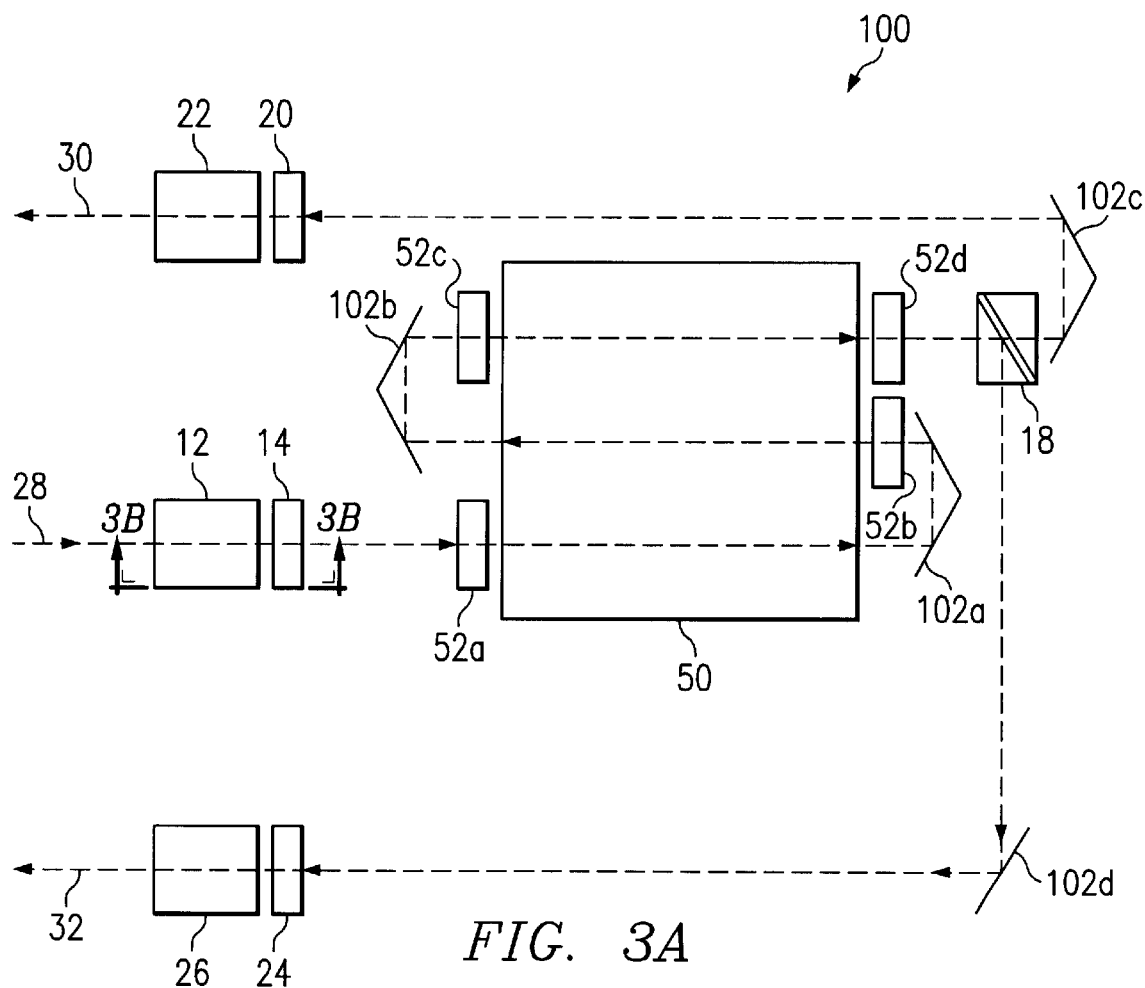
FIGS. 3A–3B illustrates another embodiment of a wavelength router.

FIG. 1 illustrates one embodiment of a wavelength router 10 that includes a first birefringent element 12, a first polarization rotator 14, wavelength filter 16, polarization dependent routing element 18, second and third polarization rotators 20 and 24, and second and third birefringent elements 22 and 26. In general, router 10 receives an input signal 28 and, based at least in part upon the orientation of elements within filter 16, generates output signals 30 and 32 comprising particular wavelength channels of input signal 28.

Birefringent elements 12, 22, and 26 comprise birefringent materials that allow a particularly polarized portion of an optical signal (e.g., vertically polarized portion) to pass through without changing course because they are ordinary waves in the element. In contrast, oppositely polarized waves (e.g., horizontally polarized portion) are redirected at an angle because of the birefringent walk-off effect. The angle of redirection is a well-known function of the particular material chosen. Examples of materials suitable for construction of the elements 12, 22, and 26 include calcite, rutile, lithium niobate, YVO4 based crystals, and the like.

Polarization rotators 14, 20, and 24 comprise twisted nematic liquid crystal rotators, ferroelectric liquid crystal rotators, pi-cell based liquid crystal rotators, magneto-optic based Faraday rotators, acousto-optic or electro-optic based polarization rotators, or any other suitable device that shifts, rotates, or otherwise changes the polarization state of an optical signal by a desired degree. In a particular embodiment, rotators 14, 20, and 24 change the polarization state of an optical signal or beam component by either zero degrees (i.e., no rotation) or by ninety degrees.

Polarization dependent routing element 18 comprises polarization beam splitters (PBS), birefringent elements, or any other suitable device that routes beam components of an optical signal along particular optical paths based upon the polarization of the particular beam component. Although element 18 is illustrated in FIG. 1 as a pair of polarization beam splitters, it should be understood that other types of polarization dependent routing elements may be substituted without departing from the scope of the invention.

Input signal 28 comprises an optical signal having a plurality of wavelength channels (e.g., a wavelength division multiplexed (WDM) or a dense wavelength division multiplexed (DWDM) optical signal). Each channel has a particular range of wavelengths (or frequencies). As used herein, the terms "channel" or "spectral band" refer to a particular wavelength or range of wavelengths (or frequencies) that define a unique information signal or group of signals. Each channel is usually evenly spaced from adjacent channels, although this is not necessary. Output signals 30 and 32 each comprise an optical signal that includes a subset of the wavelength channels associated with input signal 28.

Wavelength filter 16 comprises birefringent waveplates 50a–c, generally referred to as a birefringent waveplate 50, arranged among polarization rotators 52a–d, generally referred to as a polarization rotator 52. Although FIG. 1 illustrates three birefringent waveplates 50 and four polarization rotators 52, it should be understood that any suitable number of birefringent waveplates 50 and polarization rotators 52 may be used to perform the wavelength filtering process described herein. In a particular embodiment, waveplates 50 and rotators 52 are arranged in an alternating sequence starting and ending with rotators 52 as illustrated in FIG. 1. Polarization rotators 52 generally comprise static half-wave plates. In one embodiment described in greater detail with respect to FIG. 11, polarization rotators 52 may comprise dynamic half-wave plates that shift, rotate, or otherwise change the polarization state of a signal by a desired degree in response to a control signal.

Each birefringent waveplate 50 comprises any suitable number and combination of birefringent crystals that impart a particular amount of phase delay between beam components of an optical signal based, at least in part, upon the indices of refraction associated with the birefringent material used to construct the birefringent crystals. In one embodiment, birefringent waveplate 50 comprises a single birefringent crystal. In other embodiments, described in greater detail below with regard to FIGS. 4–6, birefringent waveplate 50 comprises an arrangement of birefringent crystals and one or more polarization rotators. In prior wavelength filters, birefringent waveplates 50 are oriented at different angles with respect to a particular reference optical axis. This cutting or rotation angle θ is described in greater detail below with respect to FIG. 2A. By arranging each waveplate 50 at a unique angle θ with respect to the reference optical axis, each waveplate 50 imparts a particular degree of polarization rotation upon beam components of an optical signal. Polarization rotators 52 are therefore not used in prior wavelength filters. Waveplates 50 used in prior wavelength filters therefore impart phase delay and perform polarization rotation to achieve a desired transmission spectrum.

Manufacturing birefringent crystals having unique angles θ for prior art wavelength routers is a delicate process. An advantage provided by the present invention is that birefringent waveplates 50 are all arranged at a common angle, θ, (e.g., zero degrees) with respect to the reference optical axis. In this respect, the cost and complexity associated with manufacturing and arranging birefringent waveplates 50 is reduced. For example, a designer is free to choose any common angle θ for all of the birefringent waveplates 50. As a result, angles θ near vulnerable cleavage planes, which induce chipping or cracking, can be readily avoided. Damage and waste are further reduced through efficient raw material utilization. For example, because all birefringent crystals are cut at an approximately common angle θ, an angle θ can be selected which results in the best yield.

Polarization rotators 52 are then arranged at particular angles, φ, with respect to the reference optical axis. For example, polarization rotator 52a may be oriented at a first angle with respect to the reference optical axis while polarization rotator 52b may be oriented at a second angle with respect to the reference optical axis. The combination of birefringent waveplates 50 and polarization rotators 52 therefore provides the appropriate amount of phase delay and polarization rotation upon the beam components of an optical signal to provide the desired transmission spectrum. Another advantage provided by the present invention is that polarization rotators 52 may be manufactured from materials (e.g., quartz) that are easier to obtain and fabricate at particular angles φ without chipping or cracking.

In operation, birefringent element 12 spatially separates input signal 28 into a first beam component 56 having a first polarization (e.g., vertical polarization, indicated using a dot) and a second beam component 58 having a second polarization (e.g., horizontal polarization, indicated using a line). Beam components 56 and 58 may also be referred to as polarization components 56 and 58. Polarization rotator 14 changes the polarization state of beam component 56 such that it has the same polarization (e.g., horizontal polarization) as beam component 58. Alternatively, polarization rotator 14 may be positioned such that it changes the polarization state of beam component 58 to match that of beam component 56.

In the embodiment illustrated in FIG. 1, wavelength filter 16 receives beam components 56 and 58 having at least substantially horizontal polarizations. The combination of birefringent waveplates 50 and polarization rotators 52 associated with filter 16 imparts a phase delay and a polarization state change upon beam components 56 and 58 to generate two eigen states for each beam component 56 and 58. The first eigen state carries a first subset of wavelength channels associated with signal 28 with the same polarization as the beam component 56 and 58 received by filter 16 (e.g., horizontal polarization, as depicted in FIG. 1). The second eigen state carries a second, complementary, subset of wavelength channels with an approximately orthogonal polarization (e.g., vertical polarization, as depicted in FIG. 1). In this respect, the polarization of the incoming beam component 56 and 58 and the two output polarizations for each beam component 56 and 58 form a pair of spectral responses. By manipulating the orientation angle φ of one or more polarization rotators 52 with respect to the reference optical axis, the amount of phase delay introduced by particular birefringent waveplates 50 may be increased or decreased. In this respect, the first and second subsets of wavelength channels may be controlled.

In a particular embodiment, birefringent waveplates 50 and polarization rotators 52 are arranged such that alternating wavelength channels are coded with one of horizontal or vertical polarization and the complementary wavelength channels are coded with the other of horizontal or vertical polarization (e.g., even channels coded with horizontal polarization and odd channels coded with vertical polarization, or vice-versa). A wavelength router 10 that achieves such a symmetric output spectra may be followed by additional stages of wavelength routers 10 in a cascaded assembly to form a demultiplexer. Each cascaded wavelength router 10 has a narrower spectral response to further slice the wavelength spectra and produce even narrower spectral bandwidths. A particular type of cascaded assembly is described in greater detail with reference to FIG. 10.

In another embodiment, a particular asymmetric output spectra may be achieved so that the wavelength router 10 may be used as an add/drop filter in a WDM network node. In this embodiment, a specific wavelength channel or subset of wavelength channels may be added or dropped through the narrower band of asymmetric spectra of the wavelength router 10, while the remaining wavelength channels continue past the wavelength router 10 through the wider complementary spectrum. This allows WDM signals to enter or leave a WDM network at a particular node.

Polarization dependent routing element 18 routes the first and second subsets of wavelength channels based upon their polarizations. For example, element 18 directs the first subset of wavelength channels having a horizontal polarization along a first optical path toward birefringent element 22. Element 18 directs the second subset of wavelength channels having a vertical polarization along a second optical path toward birefringent element 26. To recombine the spectra of the first subset of wavelength channels, polarization rotator 20 and birefringent element 22 are used. To recombine the spectra of the second subset of wavelength channels, polarization rotator 24 and birefringent element 26 are used. Output signal 30 therefore comprises the first subset of wavelength channels associated with input signal 28 while output signal 32 comprises the second, complementary, subset of wavelength channels.

FIG. 2A is a perspective diagram illustrating the angle of cutting or rotation of an exemplary birefringent crystal, such as, in one embodiment, birefringent waveplate 50. A birefringent crystal has a first refractive index n1 for light polarized along an optical axis 70 and a second refractive index n2 for light polarized along an optical axis 72 perpendicular to optical axis 70. For convenience, laboratory axes are labeled x, y, and z, with an input optical beam 74 propagating parallel to the z axis and having an input polarization 76 oriented parallel to the y direction perpendicular to z. The birefringent crystal is cut or rotated so that optical axis 70 is oriented at an angle θ in the x–y plane relative to the y-oriented direction of input polarization 76. The angle θ is defined as the cutting or rotation angle of the birefringent crystal. The propagation direction of an output optical beam 78 is oriented parallel to the z axis. Depending on the length, d, and angle θ of the birefringent crystal, the possible output beam polarizations 80 can be oriented in the x–y plane over the full three-hundred-sixty degree range of directions radially relative to the z-axis along which output optical beam 78 propagates.

FIG. 2B is a perspective diagram illustrating the angle of cutting or rotation of an exemplary polarization rotator 52 having an optical axis 90. For convenience, laboratory axes are labeled x, y, and z, with an input optical beam 74 propagating parallel to the z axis and having an input polarization 76 oriented parallel to the y direction perpendicular to z. Polarization rotator 52 is cut or rotated so that optical axis 90 is oriented at an angle φ in the x–y plane relative to the y-oriented direction of input polarization 76.

The angle φ is defined as the cutting or rotation angle of polarization rotator 52. Depending on the length, l, and cutting or rotation angle φ of polarization rotator 52, the possible output beam polarizations 94 can be oriented radially about output optical beam 92 over the full three-hundred-sixty degree range of directions in the x–y plane.

Figure 3B:
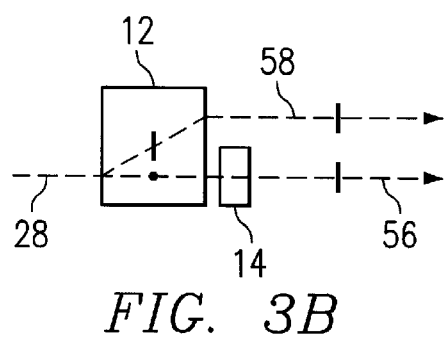

FIGS. 3A–3B illustrate one embodiment of a wavelength router 100 that includes a birefringent waveplate 50 and a plurality of polarization rotators 52. Because the birefringent waveplates 50 described above with regard to FIG. 1 may be oriented at a common angle θ, it becomes possible to replace the multiple longitudinally aligned individual birefringent waveplates 50 of FIG. 1 with fewer waveplates 50 arranged with the polarization rotators 52 in a compact assembly that uses an optical beam path that is folded. In one embodiment, the multiple birefringent waveplates 50 of FIG. 1 may be replaced by a single birefringent waveplate 50 oriented at angle θ. Wavelength router 100 further includes birefringent elements 12, 22, and 26; polarization rotators 14, 20, and 24; polarization dependent routing element 18; and reflective elements 102.

In operation, birefringent element 12 spatially separates input signal 28 into a first beam component 56 having a first polarization and a second beam component 58 having a second polarization. Polarization rotator 14 changes the polarization state of beam component 56 such that it has the same polarization as beam component 58. Alternatively, polarization rotator 14 may be positioned such that it changes the polarization state of beam component 58 to match that of beam component 56. These operations and the resulting beam components 56 and 58 are illustrated in FIG. 3B. Portions of FIG. 3A depict a single beam path for beam components 56 and 58 for illustrative purposes only.

Beam components 56 and 58 propagate through polarization rotators 52 and birefringent waveplate 50 in multiple passes along a folded optical path that is created using reflective elements 102a and 102b. The combination of birefringent waveplate 50, encountered by beam components 56 and 58 in multiple passes, and polarization rotators 52a–d imparts a phase delay and a polarization state change upon beam components 56 and 58 to generate two eigen states for each beam component 56 and 58. The first eigen state carries a first subset of wavelength channels associated with signal 28 with the same polarization as the beam component 56 and 58 received by polarization rotator 52a. The second eigen state carries a second, complementary, subset of wavelength channels with the orthogonal polarization. In this respect, the polarization of the incoming beam component 56 and 58 and the two output polarizations for each beam component 56 and 58 form a pair of spectral responses.

Polarization dependent routing element 18 routes the first and second subsets of wavelength channels based upon their polarizations. For example, element 18 together with reflective element 102c directs the first subset of wavelength channels having a horizontal polarization along a first optical path toward birefringent element 22. Element 18 directs the second subset of wavelength channels having a vertical polarization along a second optical path that is reflected using reflective element 102d toward birefringent element 26. To recombine the spectra of the first subset of wavelength channels, polarization rotator 20 and birefringent element 22 are used. To recombine the spectra of the second subset of wavelength channels, polarization rotator 24 and birefringent element 26 are used. Output signal 30 therefore comprises the first subset of wavelength channels associated with input signal 28 while output signal 32 comprises the second, complementary, subset of wavelength channels. A technical advantage of wavelength router 100 is its compact size resulting in higher optical device densities and a robust operation.

Figure 4:
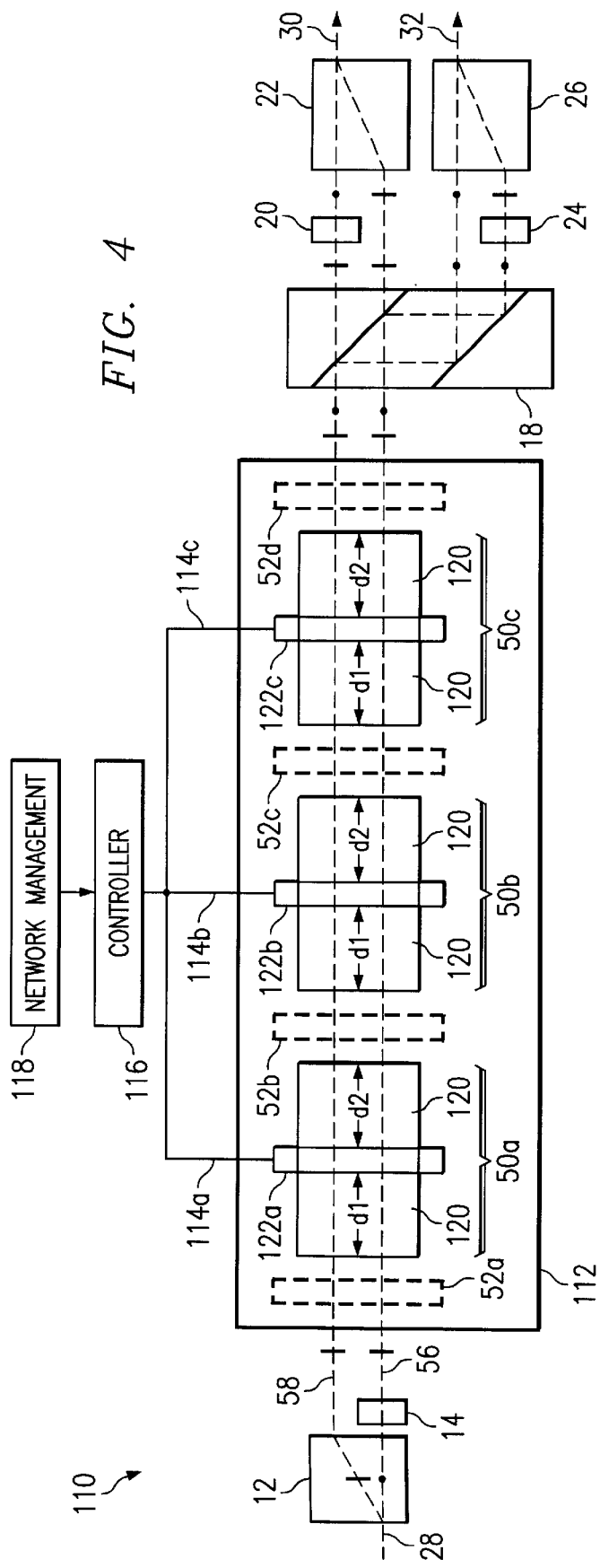
FIG. 4 illustrates one embodiment of a bandwidth variable wavelength router.

FIG. 4 illustrates one embodiment of a bandwidth variable wavelength router 110 that includes a first birefringent element 12, a first polarization rotator 14, wavelength filter 112, polarization dependent routing element 18, second and third polarization rotators 20 and 24, and second and third birefringent elements 22 and 26. In general, router 110 receives an input signal 28 and, based at least in part upon the orientation of elements within filter 112, generates output signals 30 and 32 comprising particular wavelength channels of input signal 28. The bandwidth of the wavelength channels associated with output signals 30 and 32 is variable in response to control signals 114a–c applied to elements within filter 112. In a particular embodiment, wavelength router 110 further comprises a controller 116 and a network management module 118.

Wavelength filter 112 comprises birefringent waveplates 50a–c. In one embodiment of router 110, filter 112 also comprises polarization rotators 52a–d. In another embodiment of router 110, filter 112 does not include polarization rotators 52a–d. Therefore, rotators 52a–d are illustrated using dashed lines. A birefringent waveplate 50 comprises birefringent crystals 120 separated by one or more polarization rotators 122. A first birefringent crystal 120 of a birefringent waveplate 50 has a first crystal length, d1, and a second birefringent crystal 120 of a birefringent waveplate 50 has a second crystal length, d2. In a particular embodiment, length d2 is different from length d1. As a result, an optical signal propagating in series through the birefringent crystals 120 of a birefringent waveplate 50 has an optical path length based, at least in part, upon the crystal lengths d1 and d2 of birefringent crystals 120.

The polarization rotator 122 of a birefringent waveplate 50 comprises a dynamic half-wave plate that changes the polarization state of an optical signal by a desired degree (e.g., ninety degrees) in response to a control signal 114. As will be described in greater detail below with respect to FIG. 5, by changing or not changing the polarization state of an optical signal propagating in series through birefringent crystals 120 of a birefringent waveplate 50, the effective crystal length of birefringent crystals 120 and, therefore, the optical path length of the optical signal, may be controlled. For example, if the polarization rotator 122 changes by ninety degrees the polarization state of an optical signal propagating in series through birefringent crystals 120 of waveplate 50, then the optical path length of the optical signal is based, at least in part, upon the difference between lengths d1 and d2 of birefringent crystals 120. The optical path length of the optical signal is therefore decreased. If the polarization rotator 122 changes by zero or three-hundred sixty degrees the polarization state of an optical signal propagating in series through birefringent crystals 120 of waveplate 50, then the optical path length of the optical signal is based, at least in part, upon the addition of lengths d1 and d2 of birefringent crystals 120. The optical path length of the optical signal is therefore increased. Although birefringent waveplates 50 illustrated in FIG. 4 include two birefringent crystals 120 separated by one polarization rotator 122, it should be understood that a birefringent waveplate 50 may comprise any number and combination of birefringent crystals 120 separated by an appropriate number of polarization rotators 122. For example, a birefringent waveplate 50 may comprise birefringent crystals 120 having lengths d1, d2, and d3, and polarization rotators 122 arranged among the birefringent crystals 120 in an alternating sequence. In this respect, the optical path length of an optical signal propagating in series through the birefringent crystals 120 and the polarization rotators 122 may be controlled (e.g., increased or decreased) with a higher degree of precision and granularity.

Referring back to FIG. 2A, a birefringent crystal, such as birefringent crystals 120 of a birefringent waveplate 50, has a length, d, and a cutting or rotation angle, ϕ. The birefringence, Δn, of a birefringent crystal 120 is defined as the difference between first and second refractive indices n1 and n2 such that Δn=(n2−n1). The spectral bandwidth of each wavelength channel associated with output signals 30 and 32 is a function of the product of crystal length, d, and birefringence, Δn, (i.e., d×Δn), such that as this product becomes larger, the bandwidth of each wavelength channel becomes narrower and as this product becomes smaller, the bandwidth of each wavelength channel becomes wider. As described above, the effective lengths of birefringent crystals 120 of a birefringent waveplate 50 may be modified using a polarization rotator 122 to increase or decrease the optical path length of an optical signal propagating in series through the crystals 120. By increasing the optical path length of an optical signal, such as portions of input signal 28, as it propagates through filter 112, the bandwidth of each wavelength channel associated with output signals 30 and 32 is narrowed. By decreasing the optical path length of an optical signal, such as portions of input signal 28, as it propagates through filter 112, the bandwidth of each wavelength channel associated with output signals 30 and 32 is widened.

In operation, birefringent element 12 spatially separates input signal 28 into a first beam component 56 having a first polarization (e.g., vertical polarization, indicated using a dot) and a second beam component 58 having a second polarization (e.g., horizontal polarization, indicated using a line). Polarization rotator 14 changes the polarization state of beam component 56 such that it has the same polarization (e.g., horizontal polarization) as beam component 58. Alternatively, polarization rotator 14 may be positioned such that it changes the polarization state of beam component 58 to match that of beam component 56.

As illustrated in FIG. 4, wavelength filter 112 receives beam components 56 and 58 having horizontal polarizations. In the embodiment of wavelength filter 112 that does not include polarization rotators 52, birefringent waveplates 50 are oriented at selected angles, θ, such that they impart a phase delay and a polarization state change upon beam components 56 and 58 to generate two eigen states for each beam component 56 and 58. In the embodiment of wavelength filter 112 that does include polarization rotators 52, birefringent waveplates 50 are each oriented at a common angle, θ, and the combination of birefringent waveplates 50 and polarization rotators 52 imparts a phase delay and a polarization state change upon beam components 56 and 58 to generate two eigen states for each beam component 56 and 58. Irrespective of the embodiment of wavelength filter 112 used in wavelength router 110, the first eigen state carries a first subset of wavelength channels associated with signal 28 with the same polarization as the beam component 56 and 58 received by filter 16 (e.g., horizontal polarization, as depicted in FIG. 1). Moreover, the second eigen state carries a second, complementary, subset of wavelength channels with the orthogonal polarization (e.g., vertical polarization, as depicted in FIG. 1). In this respect, the polarization of the incoming beam component 56 and 58 and the two output polarizations for each beam component 56 and 58 form a pair of spectral responses.

Polarization dependent routing element 18 routes the first and second subsets of wavelength channels based upon their polarizations. For example, element 18 directs the first subset of wavelength channels having a horizontal polarization along a first optical path toward birefringent element 22. Element 18 directs the second subset of wavelength channels having a vertical polarization along a second optical path toward birefringent element 26. To recombine the spectra of the first subset of wavelength channels, polarization rotator 20 and birefringent element 22 are used. To recombine the spectra of the second subset of wavelength channels, polarization rotator 24 and birefringent element 26 are used. Output signal 30 therefore comprises the first subset of wavelength channels associated with input signal 28 while output signal 32 comprises the second, complementary, subset of wavelength channels.

Figure 5:
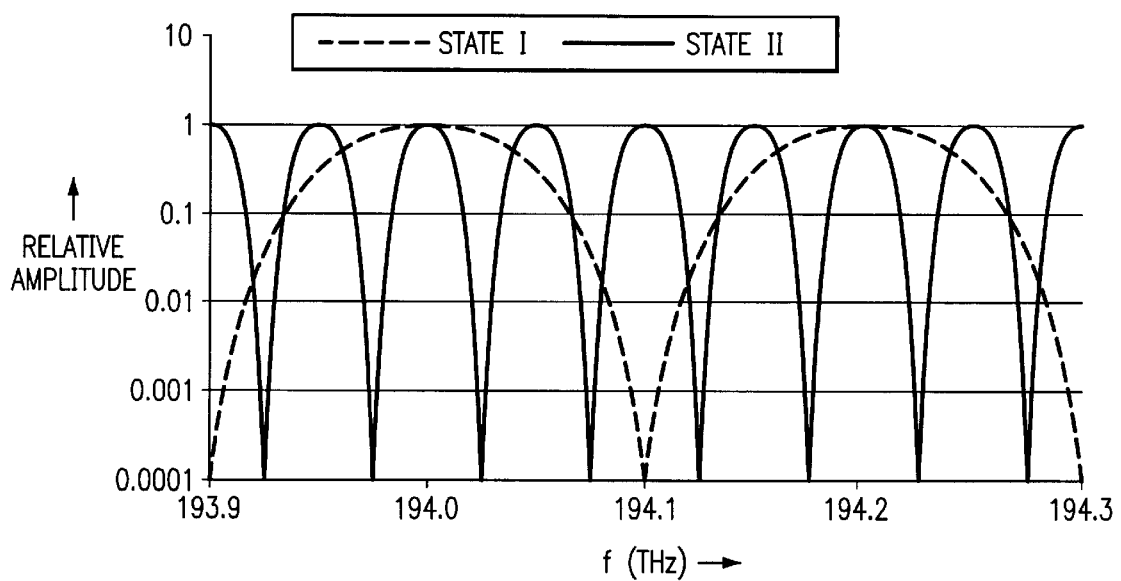
FIG. 5 is a graphical illustration showing relative amplitude varying by frequency in various stages of operation.

The spectral bandwidth of the wavelength channels associated with output signals 30 and 32 are variable in response to control signals 114. Referring now to FIG. 5, if control signals 114a–c cause polarization rotators 122a–c to change by ninety degrees the polarization of beam components 56 and 58 within each particular birefringent waveplate 50, then the optical path lengths of beam components 56 and 58 are based, at least in part, upon the difference between lengths d1 and d2 of birefringent crystals 120. Therefore, the optical path lengths of beam components 56 and 58 are decreased such that the bandwidth of each wavelength channel associated with output signals 30 and 32 is widened, as illustrated in State I of FIG. 5. If control signals 114a–c cause polarization rotators 122a–c to change by zero or three-hundred-sixty degrees the polarization state of beam components 56 and 58 within each particular birefringent waveplate 50, then the optical path lengths of beam components 56 and 58 are based, at least in part, upon the addition of lengths d1 and d2 of birefringent crystals 120. Therefore, the optical path lengths of beam components 56 and 58 are increased such that the bandwidth of each wavelength channel associated with output signals 30 and 32 is narrowed, as illustrated in State II of FIG. 5.

In some embodiments, controller 116 communicates particular control signals 114 to polarization rotators 122 in response to a control packet received from network management module 118. For example, a control packet from network management module 118 may contain a control message requesting a change in the spectral bandwidth of wavelength channels associated with output signals 30 and 32 from wider wavelength channels to narrower wavelength channels. In this respect, a higher channel density is achieved over a particular range of wavelengths. Controller 116 receives and interprets the control message and, in response, communicates control signals 114a–c to polarization rotators 122a–c, respectively, that change the operation of wavelength router 110 from State I (i.e., low channel density) to State II (i.e., high channel density). Of course, the control packet may also request a change in operation of wavelength router 110 from State II to State I.

Figure 6:
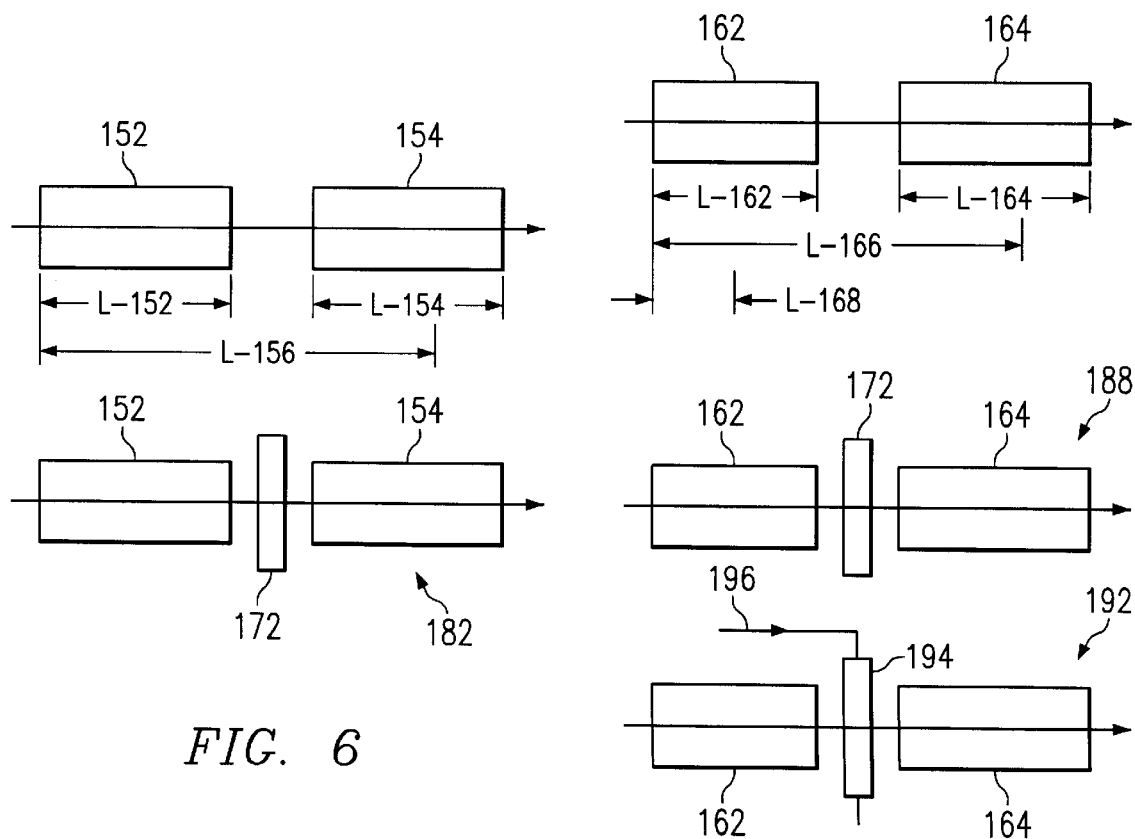
FIG. 6 is a schematic representation illustrating various principles of a bandwidth variable wavelength router.
Figure 7:
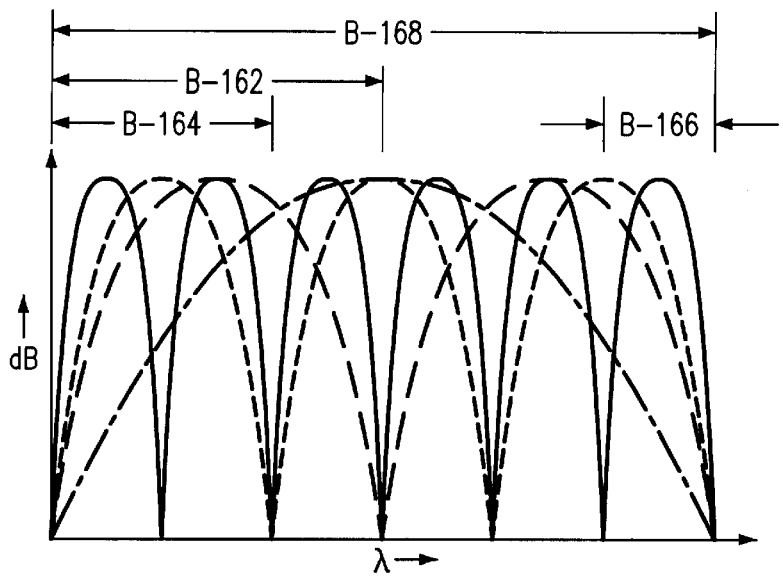
FIG. 7 is a graphic representation of the relative spectral responses of wavelength channels processed by the exemplary birefringent crystal configurations of FIG. 6 depicting bandwidths in arbitrary wavelength units horizontally and relative amplitudes vertically.

FIG. 6 is a schematic representation illustrating underlying principles of bandwidth variable wavelength router 110. For purposes of clarity, each of the birefringent crystals depicted in FIG. 6 have identical birefringence, Δn. FIG. 7 is a graphic representation of the relative spectral responses of wavelength channels processed by the exemplary birefringent crystal configurations of FIG. 6 depicting bandwidths in arbitrary wavelength units horizontally and relative amplitudes vertically.

Referring now to FIG. 6, birefringent crystals 152 and 154 have equal crystal lengths L-152 and L-154. If an optical beam passes longitudinally in series through birefringent crystals 152 and 154 oriented at the same angle θ, then the effective crystal length L-156 comprises the addition of individual lengths L-152 and L-154. As described above with regard to FIG. 4, the spectral bandwidth of associated wavelength channels is accordingly narrowed. If birefringent crystals 152 and 154 are rotated by ninety degrees relative to one another about the input beam axis, then their corresponding refractive indices are reversed so that their birefringence is canceled. The effective crystal length is consequently zero, and the spectral bandwidth of associated wavelength channels is substantially unrestricted.

Birefringent crystals 162 and 164 have unequal lengths L-162 and L-164 associated with unequal spectral bandwidths B-162 and B-164. If an optical beam passes longitudinally in series through birefringent crystals 162 and 164 oriented at the same angle θ, then the effective crystal length L-166 comprises the addition of individual lengths L-162 and L-164. Again, the spectral bandwidth of associated wavelength channels is accordingly narrowed, as illustrated by B-166 in FIG. 7. However, if birefringent crystals 162 and 164 are rotated by ninety degrees relative to one another about the input beam axis, then their corresponding refractive indices are reversed. The effective crystal length L-168 comprises the difference between individual crystal lengths L-162 and L-164. The spectral bandwidth of associated wavelength channels is accordingly widened, as illustrated by B-168 in FIG. 7.

If a half-wave plate 172 is inserted between birefringent crystals 152 and 154 as illustrated in optical configuration 182, then the polarization state of an optical beam propagating through configuration 182 will be changed by ninety degrees. For beam propagation through birefringent crystal 154, changing the beam polarization by ninety degrees about the beam axis is equivalent to rotating the birefringent crystal 154 by ninety degrees about the beam axis. Therefore, crystal lengths L-152 and L-154 of configuration 182 will cancel, providing substantially unrestricted wavelength channel bandwidth, as described above. Similarly, inserting a half-wave plate 172 between birefringent crystals 162 and 164 as illustrated in optical configuration 188 causes the polarization state of an optical beam propagating through configuration 188 to change by ninety degrees about the beam axis. For beam propagation through birefringent crystal 164, changing the beam polarization by ninety degrees about the beam axis is equivalent to rotating the birefringent crystal 164 by ninety degrees about the beam axis. Therefore, crystal lengths L-162 and L-164 of configuration 188 will yield an effective crystal length of L-168, providing a wavelength channel bandwidth B-168. As a result, changing the polarization state of a beam by ninety degrees prior to propagation through a birefringent crystal, such as crystals 154 and 164 of configurations 182 and 188, is equivalent to rotating crystals 154 and 164 by ninety degrees with respect to crystals 152 and 162, respectively. Combining rotation of the birefringent crystals relative to one another with a half-wave plate inserted between crystals will result in behavior equivalent to that of combining no half-wave plate with no rotation of birefringent crystals.

Optical configuration 192 is similar to optical configuration 188, except that a dynamic half-wave plate 194 is inserted in place of static half-wave plate 172 between birefringent crystals 162 and 164. Dynamic half-wave plate 194 has two operating states controllable by applying an external control signal 196. In State I, dynamic half-wave plate 194 exhibits normal half-wave plate behavior, whereas in State II, dynamic half-wave plate 194 exhibits no half-wave plate behavior and acts substantially as a passive transparent optical window. Accordingly, in State I, optical configuration 192 has an effective crystal length L-168 equal to the difference between individual lengths L-162 and L-164, resulting in wavelength channel bandwidth B-168. In State II, optical configuration 192 has an effective length L-166 equal to the addition of individual lengths L-162 and L-164, resulting in wavelength channel bandwidth B-166. As a result, the use of a dynamic half-wave plate to control the effective crystal length of a combination of birefringent crystals facilitates dynamically variable bandwidth wavelength channels. Moreover, the use of these polarization control techniques with the birefringent crystals 120 and polarization rotators 122 illustrated in FIG. 4 facilitates variable bandwidth wavelength routing.

Figure 8A:
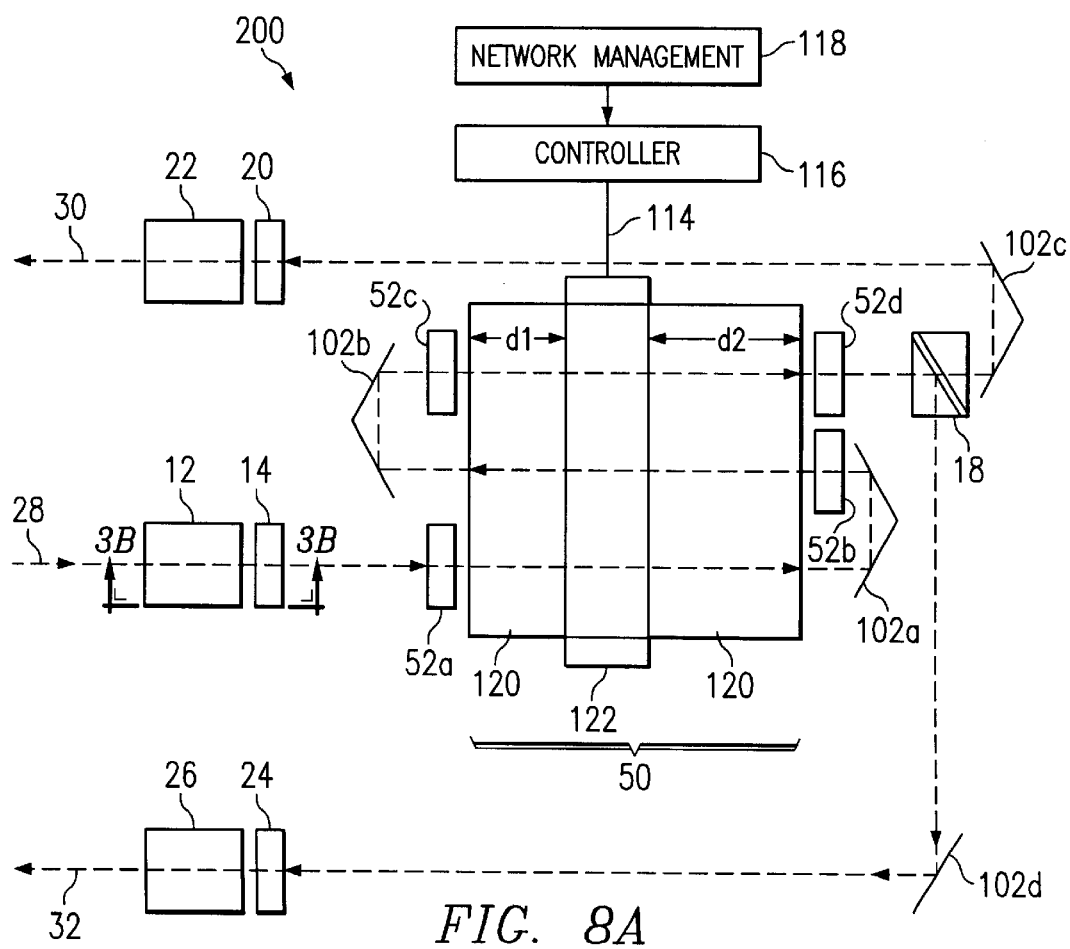
FIGS. 8A–8B illustrate another embodiment of a bandwidth variable wavelength router.
Figure 8B:
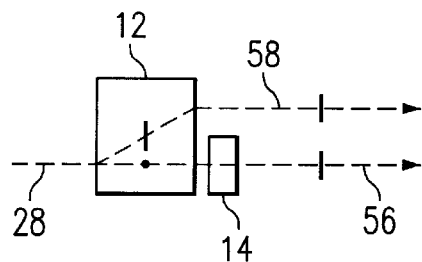

FIGS. 8A–8B illustrate one embodiment of a bandwidth variable wavelength router 200 that includes a birefringent waveplate 50 and a plurality of polarization rotators 52. Because, in one embodiment, the birefringent waveplates 50 described above with regard to FIG. 4 may be oriented at a common angle θ, it becomes possible to replace the multiple longitudinally aligned individual birefringent waveplates 50 of FIG. 4 with fewer waveplates 50 arranged with the polarization rotators 52 in a compact assembly that uses an optical beam path that is folded. In one embodiment, the multiple birefringent waveplates 50 of FIG. 4 may be replaced by a single birefringent waveplate 50 that comprises birefringent crystals 120 and polarization rotator 122. Wavelength router 200 further includes birefringent elements 12, 22, and 26; polarization rotators 14, 20, and 24; polarization dependent routing element 18; and reflective elements 102.

In operation, birefringent element 12 spatially separates input signal 28 into a first beam component 56 having a first polarization and a second beam component 58 having a second polarization. Polarization rotator 14 changes the polarization state of beam component 56 such that it has the same polarization as beam component 58. Alternatively, polarization rotator 14 may be positioned such that it changes the polarization state of beam component 58 to match that of beam component 56. These operations and the resulting beam components 56 and 58 are illustrated in FIG. 8B. Portions of FIG. 8A depict a single beam path for beam components 56 and 58 for illustrative purposes only.

Beam components 56 and 58 propagate through polarization rotators 52 and birefringent waveplate 50 in multiple passes along a folded optical path that is created using reflective elements 102a and 102b. The combination of birefringent waveplate 50, encountered by beam components 56 and 58 in multiple passes, and polarization rotators 52a–d imparts a phase delay and a polarization state change upon beam components 56 and 58 to generate two eigen states for each beam component 56 and 58. The first eigen state carries a first subset of wavelength channels associated with signal 28 with the same polarization as the beam component 56 and 58 received by polarization rotator 52a. The second eigen state carries a second, complementary, subset of wavelength channels with the orthogonal polarization. In this respect, the polarization of the incoming beam component 56 and 58 and the two output polarizations for each beam component 56 and 58 form a pair of spectral responses.

Polarization dependent routing element 18 routes the first and second subsets of wavelength channels based upon their polarizations. For example, element 18 together with reflective element 102c directs the first subset of wavelength channels having a horizontal polarization along a first optical path toward birefringent element 22. Element 18 directs the second subset of wavelength channels having a vertical polarization along a second optical path that is reflected using reflective element 102d toward birefringent element 26. To recombine the spectra of the first subset of wavelength channels, polarization rotator 20 and birefringent element 22 are used. To recombine the spectra of the second subset of wavelength channels, polarization rotator 24 and birefringent element 26 are used. Output signal 30 therefore comprises the first subset of wavelength channels associated with input signal 28 while output signal 32 comprises the second, complementary, subset of wavelength channels.

As described above with regard to FIG. 4, the spectral bandwidth of the wavelength channels associated with output signals 30 and 32 are variable in response to control signal 114. If control signal 114 causes polarization rotator 122 to change by ninety degrees the polarization of beam components 56 and 58 along any given pass of components 56 and 58 through birefringent waveplate 50, then the optical path lengths of beam components 56 and 58 are based, at least in part, upon the difference between lengths d1 and d2 of birefringent crystals 120. Therefore, the optical path lengths of beam components 56 and 58 are decreased such that the bandwidth of each wavelength channel associated with output signals 30 and 32 is widened, as illustrated in State I of FIG. 5. If control signal 114 causes polarization rotator 122 to change by zero or three-hundred-sixty degrees the polarization of beam components 56 and 58 along any given pass of components 56 and 58 through birefringent waveplate 50, then the optical path lengths of beam components 56 and 58 are based, at least in part, upon the addition of lengths d1 and d2 of birefringent crystals 120. Therefore, the optical path lengths of beam components 56 and 58 are increased such that the bandwidth of each wavelength channel associated with output signals 30 and 32 is narrowed, as illustrated in State II of FIG. 5. In a particular embodiment, controller 116 communicates a particular control signal 114 to polarization rotator 122 in response to a control packet from network management module 118.

Figure 9:
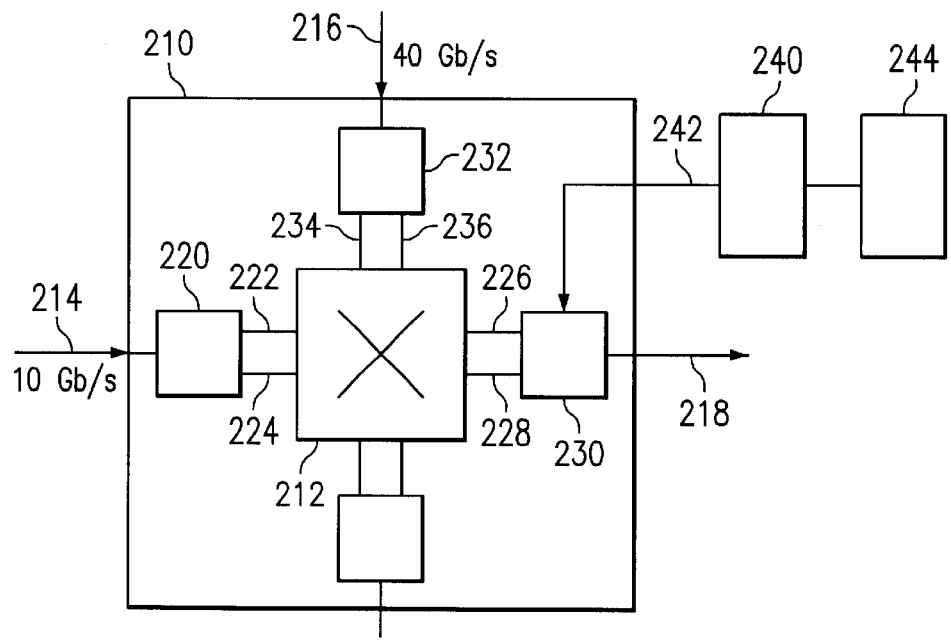
FIG. 9 is a simplified block diagram illustrating one example of an application of a bandwidth variable wavelength router.

FIG. 9 is a simplified block diagram illustrating an application of a bandwidth variable wavelength router, such as routers 110 and/or 200 within a bit-rate transparent optical router 210. Optical router 210 includes optical switch 212 that selectively interconnects input and output ports, for example, ports 214, 216, and 218, which communicate across an optical communications network. An optical input data stream having, for example, 10 Gb/s bit rate wavelength channels, enters at input port 214 and is demultiplexed by a demultiplexer 220 into, for example, odd and even wavelength channels 222 and 224, which are then switched through optical switch 212 and propagate as channels 226 and 228, which are then multiplexed by a multiplexer 230 and delivered to output port 218. Another optical input data stream having 40 Gb/s bit rate wavelength channels enters router 210 through input port 216 from a different source in the network, and is also routed to output port 218. Demultiplexer 232 demultiplexes the 40 Gb/s data stream into, for example, odd and even wavelength channels 234 and 236, which enter optical switch 212. Optical switch 212 processes the two different bit-rate data streams without difficulty, since optical switch 212 is essentially bit-rate transparent. However, prior art wavelength routers are not bit-rate transparent, and if multiplexer 230 is a conventional wavelength router, it cannot adapt to varying bit rates from different sources within the network. The result is that prior art optical routers cannot optimally handle variable bit rate data streams.

If multiplexer 230 is a bandwidth variable wavelength router 110 and/or 200 as described above in connection with FIGS. 4 and 8A–B, then it can adapt to accommodate both the 10 Gb/s and the 40 Gb/s input data streams. Bandwidth variable wavelength router 230 is communicatively coupled to a controller 240, which provides control signals 242 that change the properties of dynamic half-wave plates internal to bandwidth variable wavelength router 230. If, for example, network management module 244 detects in the network that bandwidth variable wavelength router 230 is initially processing a 10 Gb/s data stream in a narrow bandwidth State II (high wavelength channel density within a particular wavelength range), as defined above, but is subsequently required to process a new data stream at 40 Gb/s, then network management module 244 communicates a control packet to controller 240 indicating that variable bandwidth wavelength routing is desired. In response, controller 240 communicates a control signal 242 to wavelength router 230 to change the state of operation of wavelength router 230 from narrow bandwidth State II (high wavelength channel density) to wide bandwidth State I (low wavelength channel density). Operating in State I, as described above, wavelength router 230 can readily process the new 40 Gb/s data stream. In this respect, wavelength router 230 can maximize the bandwidth utilization for a 10 Gb/s input data stream and still adapt to meet the bandwidth requirements of a 40 Gb/s input data stream.

In accordance with International Telecommunications Union (ITU) standards, only discrete bit rate values are generally allowed for data streams in an optical network. For example, OC48 with 2.5 Gb/s bit rate, OC192 with 10 Gb/s bit rate, and OC768 with 40 Gb/s bit rate are typical configurations. Other bit rates may be supported as optical networks evolve. A technical advantage of wavelength router 230 is that it may be dynamically configured to process data streams having these and other bit rates.

Figure 10:
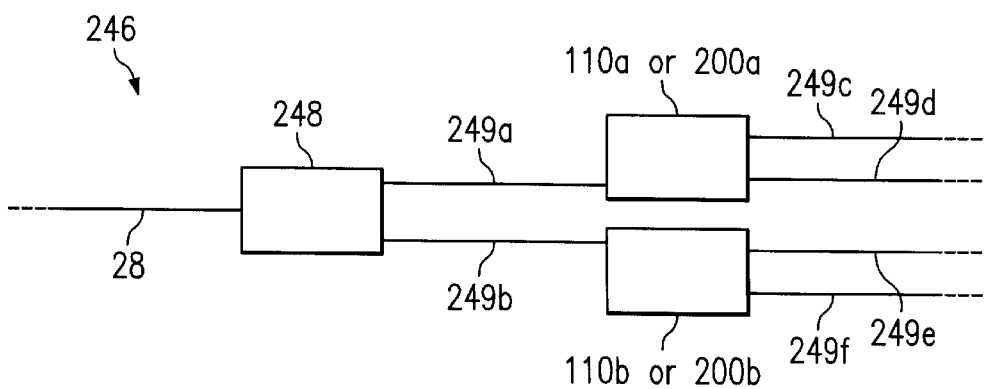
FIG. 10 illustrates one embodiment of a cascaded architecture that includes a wavelength router communicatively coupled to bandwidth variable wavelength routers.

FIG. 10 illustrates one embodiment of a cascaded architecture 246 that includes a wavelength router 248 communicatively coupled to bandwidth variable wavelength routers 110a and 110b. Although the description of FIG. 10 is detailed with respect to routers 110a–b, it should be understood that routers 200a–b may be used without departing from the scope of the present invention. Wavelength router 248 comprises any suitable optical device that receives an optical signal 28 and generates signals 249a and 249b. Signals 249a and 249b each comprise subsets of wavelength channels associated with signal 28. For example, signal 249a comprises even wavelength channels associated with signal 28 and signal 249b comprises odd wavelength channels associated with signal 28. In this respect, the channel spacing of each wavelength channel in signals 249a and 249b is twice that of the channel spacing of wavelength channels in signal 28. For example, if signal 28 is a 50 Ghz signal, then signals 249a and 249b are each 100 Ghz signals. In a particular embodiment, router 248 comprises any of the wavelength routers described herein.

Bandwidth variable wavelength routers 110a–b receive signals 249a–b and, depending upon the operation of routers 110a and 110b, generate two or more of output signals 249c–d and 249e–f, respectively. For example, if routers 110a and 110b are operating in a first state, then routers 110a–b receive signals 249a and 249b and generate signals 249c–d and 249e–f, respectively. Operating in this state, for example, routers 110a and 110b receive 100 Ghz signals (e.g., 249a–b) and generate 200 Ghz signals (e.g., 249c–d and 249e–f). In this respect, architecture 246 operates as a 1×4 device. If routers 110a and 110b are operating in a second state, then routers 110*a–b* receive signals 249*a* and 249*b* and generate signals 249*c* and 249*e*, respectively. Operating in this state, for example, routers 110*a* and 110*b* receive 100 Ghz signals (e.g., 249*a–b*) and generate 100 Ghz signals (e.g., 249*c* and 249*e*) having better isolation characteristics. In this respect, architecture 246 operates as a 1×2 device. A technical advantage of architecture 246 is that routers 110*a* and 110*b* provide bandwidth variable spectral processing to meet the demands of a growing and changing optical network.

Figure 11:
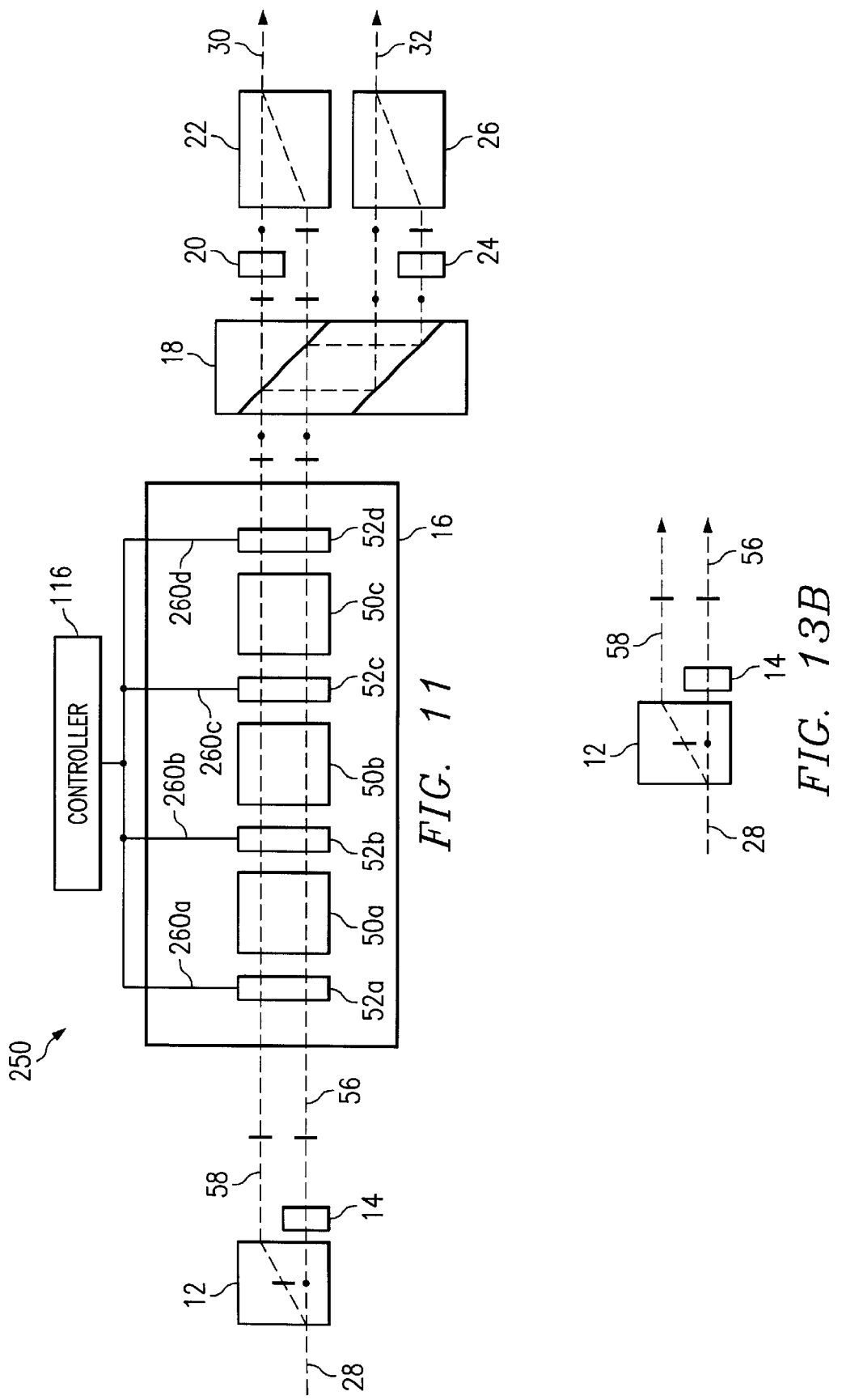
FIG. 11 illustrates one embodiment of a switchable wavelength router.

FIG. 11 illustrates one embodiment of a switchable wavelength router 250 that includes a first birefringent element 12, a first polarization rotator 14, wavelength filter 16, polarization dependent routing element 18, second and third polarization rotators 20 and 24, and second and third birefringent elements 22 and 26. In general, router 250 receives an input signal 28 and, based at least in part upon the orientation of elements within filter 16 and the application of control signals 260, generates output signals 30 and 32 comprising particular wavelength channels of input signal 28.

Each birefringent waveplate 50*a–c* of switchable wavelength router 250 is oriented at a common angle θ. Polarization rotators 52 of switchable wavelength router 250 comprise dynamic half-wave plates made from, for example, liquid crystal material. Each polarization rotator 52*a–d* is oriented at a particular angle φ and operates in response to a corresponding control signal 260*a–d*, generally referred to as control signal 260.

Figure 12:
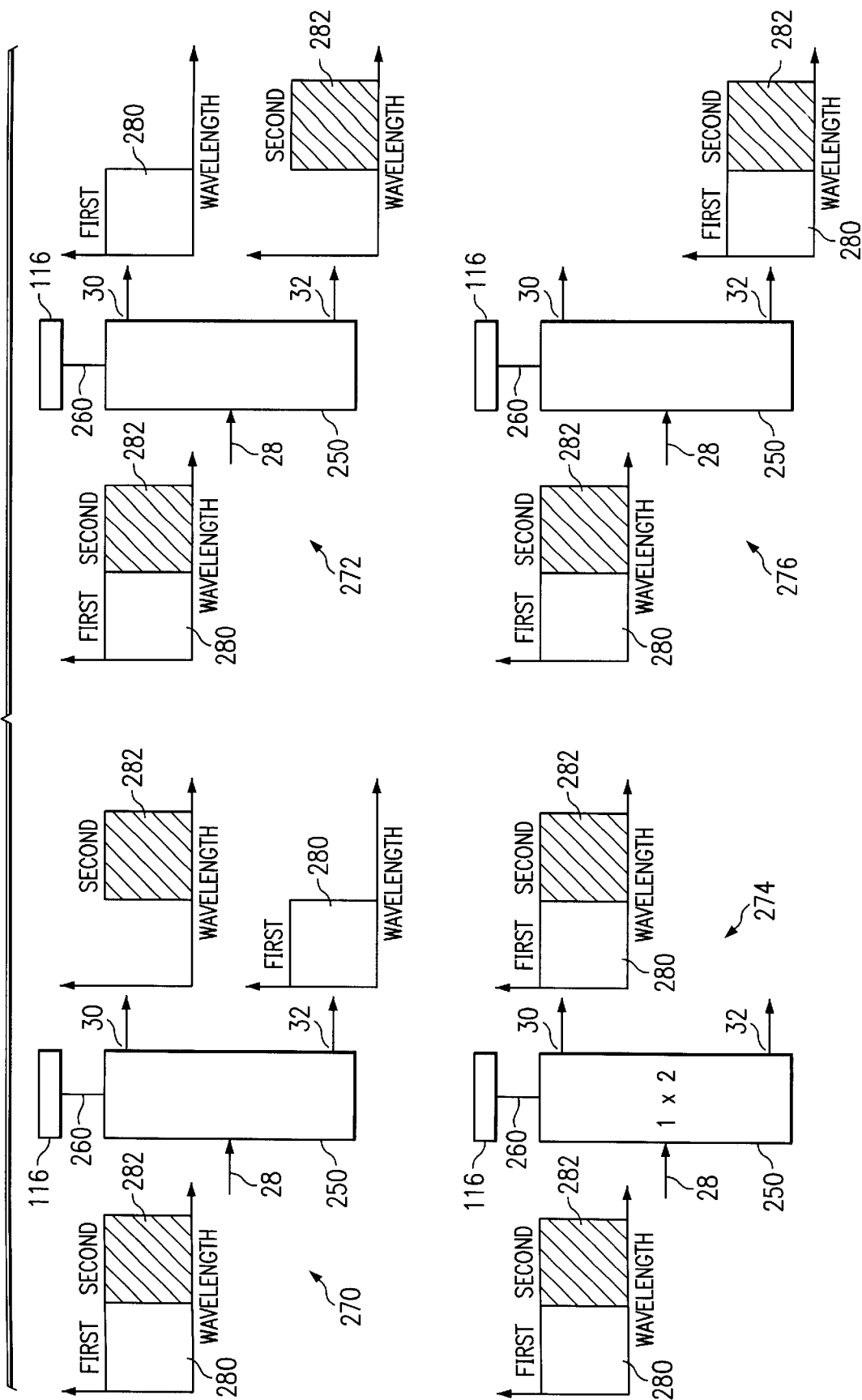
FIG. 12 illustrates one example of the operation of switchable wavelength router to yield four different output states.

FIG. 12 illustrates the operation of switchable wavelength router 250 to yield four different output states 270, 272, 274, and 276. In each output state 270–276, switchable wavelength router 250 receives an input signal 28 comprising first and second subsets of wavelength channels 280 and 282. By applying particular control signals 260 to particular polarization rotators 52*a–d*, particular subsets of wavelength channels 280 and 282 may be switched among and between output signals 30 and 32.

In output state 270, control signals 260*a–d* applied to polarization rotators 52*a–d* cause polarization rotators 52*a–d* to operate as ordinary half-wave plates. For example, control signals 260*a–d* may apply zero volts to each of the polarization rotators 52*a–d*. As a result, the polarization of first wavelength subset 280 is orthogonal to the polarization of second wavelength subset 282. Output signal 30 comprises first wavelength subset 280 while output signal 32 comprises second wavelength subset 282.

In output state 272, a control signal 260 is applied to a selected one of polarization rotators 52*a* or 52*d* such that it causes the selected polarization rotator 52*a* or 52*d* to change the polarization state of the beam components 56 and 58 by ninety degrees with respect to the polarization state of the beam components 56 and 58 during the operation of router 250 in output state 270. For example, a control signal 260*a* may be applied to polarization rotator 52*a* to cause it to change the polarization state of beam components 56 and 58 by ninety degrees with respect to the polarization state of the beam components 56 and 58 during the operation of router 250 in output state 270. The remaining control signals 260*b–d* cause polarization rotators 52*b–d* to operate as ordinary half-wave plates. In another example, a control signal 260*d* may be applied to polarization rotator 52*d* to cause it to change the polarization state of beam components 56 and 58 by ninety degrees with respect to the polarization state of the beam components 56 and 58 during the operation of router 250 in output state 270. The remaining control signals 260*a–c* cause polarization rotators 52*a–c* to operate as ordinary half-wave plates. As a result, the polarization of first wavelength subset 280 is orthogonal to the polarization of second wavelength subset 282. Output signal 30 comprises second wavelength subset 282 while output signal 32 comprises first wavelength subset 280.

In output state 274, a sufficient voltage is applied by control signals 260*a–d* to polarization rotators 52*a–d* to eliminate the birefringence properties of the liquid crystal material, for example, from which polarization rotators 52*a–d* are made. In this respect, the polarization state of beam components 56 and 58 communicated by filter 16 is the same as the polarization state of beam components 56 and 58 received by filter 16. As a result, the polarization of first wavelength subset 280 is substantially equal to the polarization of second wavelength subset 282. Output signal 30 comprises first and second wavelength subsets 280 and 282.

In output state 276, a control signal 260 is applied to a selected one of polarization rotators 52*a* or 52*d* such that it causes the selected polarization rotator 52*a* or 52*d* to change the polarization state of the beam components 56 and 58 by ninety degrees. For example, a control signal 260*a* may be applied to polarization rotator 52*a* to cause it to change the polarization state of beam components 56 and 58 by ninety degrees. The remaining control signals 260*b–d* apply a sufficient voltage to polarization rotators 52*b–d* to eliminate the birefringence properties of the liquid crystal material, for example, from which rotators 52*b–d* are made. In another example, a control signal 260*d* may be applied to polarization rotator 52*d* to cause it to change the polarization state of beam components 56 and 58 by ninety degrees. The remaining control signals 260*a–c* apply a sufficient voltage to polarization rotators 52*a–c* to eliminate the birefringence properties of the liquid crystal material, for example, from which rotators 52*a–c* are made. In this respect, the polarization state of beam components 56 and 58 communicated by filter 16 is orthogonal to the polarization state of beam components 56 and 58 received by filter 16. As a result, the polarization of first wavelength subset 280 is substantially equal to the polarization of second wavelength subset 282. Output signal 32 comprises first and second wavelength subsets 280 and 282.

FIGS. 13A–13B illustrate one embodiment of a wavelength router 300 that includes a birefringent waveplate 50 and a plurality of polarization rotators 52. Because the birefringent waveplates 50 described above with regard to FIG. 11 may be oriented at a common angle θ, it becomes possible to replace the multiple longitudinally aligned individual birefringent waveplates 50 of FIG. 11 with fewer waveplates 50 arranged with the polarization rotators 52 in a compact assembly that uses an optical beam path that is folded. In one embodiment, the multiple birefringent waveplates 50 of FIG. 11 may be replaced by a single birefringent waveplate 50 oriented at angle θ. Wavelength router 300 further includes birefringent elements 12, 22, and 26; polarization rotators 14, 20, and 24; polarization dependent routing element 18; reflective elements 102; and controller 116. Polarization rotators 52 of switchable wavelength router 300 comprise dynamic half-wave plates made from, for example, liquid crystal material. Each polarization rotator 52*a–d* is oriented at a particular angle φ and operates in response to a corresponding control signal 260*a–d*, generally referred to as control signal 260. Switchable wavelength router 300 may implement output states 270–276 using the same application of control signals 260 as described above with regard to FIG. 12.

A technical advantage of switchable wavelength routers 250 and 300 is that they provide switchable beam path control in optical network applications. This allows the switchable wavelength routers 250 and 300 to function as an optical wavelength router in an optical network and to perform, for example, protection switching and restoration of optical data paths. Additionally, it can recognize new wavelength bands and switch subsets of wavelength channels among outputs. These advantages result at least in part from using dynamic half-wave plates whose properties are controlled by the application of control signals, which can be accomplished adaptively or programmably.

FIGS. 14A–14B illustrate an application of switchable wavelength routers 250 or 300 to facilitate first and second optical communication traffic patterns 310 and 330. For example, in a first traffic pattern 310 illustrated in FIG. 14A, traffic in a path 312 from a network node 314 is demultiplexed for propagation along two paths 316 and 318 at a first switchable wavelength router 250a (or 300). Traffic along path 316 enters an intermediate network node 320, which communicates the traffic along a path 322. Traffic along paths 318 and 322 are then multiplexed by a second switchable wavelength router 250b (or 300), and then propagated along path 324 to another network node 326. It should be noted that wavelength routers 250 (or 300) are reciprocal devices that may perform both multiplexing and demultiplexing operations. This permits second switchable wavelength router 250b (or 300) to perform a traffic add operation complementary to the traffic drop operation performed by first switchable wavelength router 250a (or 300). This reciprocity further allows the entire flow of traffic in pattern 310 to be reversed, i.e., propagation of traffic from node 326 to nodes 320 and 314. Both first and second switchable wavelength routers 250a–b in this example operate in output state 270 described above with regard to FIG. 12. Alternatively, first and second switchable wavelength routers 250 may both operate in output state 272.

In a second traffic pattern 330, illustrated in FIG. 14B, intermediate node 318 is entirely bypassed. In this case, first switchable wavelength router 250a (or 300) operates in output state 274, so that all traffic is routed from node 314 along paths 312 and 318. Second switchable wavelength router 250b (or 300) also operates in output state 274, thereby capturing all traffic routed by first switchable wavelength router 250a (or 300). Second switchable wavelength router 250b (or 300) then routes the traffic along path 324 to node 326. Because switchable wavelength routers 250a–b (or 300) are reciprocal devices that may perform both multiplexing and demultiplexing operations, the flow of traffic in second traffic pattern 330 can also be reversed. Moreover, first and second switchable wavelength routers 250a–b (or 300) can both operate in output state 276.

By deploying switchable wavelength routers 250 (or 300) in an optical communication network as described in FIGS. 14A–B, it is possible to route traffic based on the data carrying capacity of particular optical paths. For example, during the daytime, path 318 may not have enough data carrying capacity to support all of the traffic to be communicated from network node 314 to node 326. Switchable wavelength routers 250 (or 300) may be used to route a portion of the traffic from node 314 to node 326 via intermediate node 320. In this respect, paths 316 and 322 remove some of the traffic burden from path 318. During the nighttime, however, when the traffic flow subsides and path 318 does have enough data carrying capacity to support all of the traffic to be communicated from network node 314 to node 326, switchable wavelength routers 250 (or 300) may bypass intermediate node 320. In this respect, switchable wavelength routers 250 (or 300) facilitate traffic shaping.

Although wavelength routers 10, 100, 110, 200, 250, and 300 and their advantages have been described in detail, it should be understood that various changes, substitutions and alterations can be made herein without departing from the spirit and scope of the invention as defined by the appended claims. For example, wavelength routers 10, 100, 110, 200, 250, and 300 are reciprocal devices, such that optical signals having the properties of output signals 30 and 32 can be propagated in the reverse direction and combined within wavelength routers 10, 100, 110, 200, 250, and 300 to produce an output signal having the properties of input signal 28. In this respect, wavelength routers 10, 100, 110, 200, 250, and 300 may perform both multiplexing and demultiplexing operations.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An optical device, comprising:
 a first birefringent crystal having a first length;
 a second birefringent crystal having a second length, wherein an optical signal propagating through the first and second birefringent crystals has an effective optical path length based, at least in part, upon the first length of the first birefringent crystal and the second length of the second birefringent crystal; and
 a dynamic polarization rotator operable to adjust the effective optical path length of the optical signal in response to a control signal.

2. The device of claim 1, wherein the dynamic polarization rotator is operable to change the polarization state of at least a portion of the optical signal by approximately ninety degrees such that the effective optical path length is based, at least in part, upon the difference between the first length of the first birefringent crystal and the second length of the second birefringent crystal.

3. The device of claim 1, wherein the dynamic polarization rotator is operable to change the polarization state of at least a portion of the optical signal by either approximately zero degrees or approximately three-hundred-sixty degrees such that the effective optical path length is based, at least in part, upon the addition of the first length of the first birefringent crystal and the second length of the second birefringent crystal.

4. The device of claim 1, further comprising a third birefringent crystal having a third length and a second dynamic polarization rotator operable to adjust the effective optical path length of the optical signal in response to a second control signal.

5. The device of claim 1, wherein the first length of the first birefringent crystal is not equal to the second length of the second birefringent crystal.

6. The device of claim 1, further comprising a plurality of birefringent waveplates arranged such that when the optical signal propagates through the first and second birefringent crystals, the polarization rotator, and the plurality of birefringent waveplates, it is processed into a first subset of wavelengths having a first polarization and a second subset of wavelengths having a second polarization.

7. The device of claim 6, wherein the first subset of wavelengths and the second subset of wavelengths each comprise a plurality of wavelength channels, each wavelength channel having a particular bandwidth such that:
if the dynamic polarization rotator changes the polarization state of beam components associated with the optical signal by approximately ninety degrees, then each wavelength channel has a first bandwidth; and
if the dynamic polarization rotator changes the polarization state of beam components associated with the optical signal by either approximately zero degrees or approximately three-hundred-sixty degrees, then each wavelength channel has a second bandwidth that is narrower than the first bandwidth.

8. The device of claim 6, wherein the plurality of birefringent waveplates are oriented at a substantially common angle about an optical axis, the optical device further comprising a plurality of polarization rotators arranged among the plurality of birefringent waveplates.

9. The device of claim 8, wherein each of the birefringent waveplates introduces a phase delay between a first polarization component of the optical signal and a second polarization component of the optical signal.

10. The device of claim 9, wherein each of the polarization rotators arranged among the birefringent waveplates is operable to change the polarization state of at least one of the first polarization component and the second polarization component.

11. The device of claim 8, wherein:
a first polarization rotator arranged among the birefringent waveplates is oriented at a first angle about the optical axis; and
a second polarization rotator arranged among the birefringent waveplates is oriented at a second angle about the optical axis.

12. The device of claim 11, wherein the first and second subsets of wavelengths are based, at least in part, upon the first angle of the first polarization rotator and the second angle of the second polarization rotator.

13. The device of claim 8, wherein the first and second subsets of wavelengths are based, at least in part, upon the common angle of the plurality of birefringent waveplates.

14. The device of claim 8, wherein the common angle of the plurality of birefringent waveplates is approximately zero degrees.

15. The device of claim 8, wherein the first subset of wavelengths is approximately complementary to the second subset of wavelengths.

16. The device of claim 11, wherein adjusting at least one of the first angle of the first polarization rotator and the second angle of the second polarization rotator adjusts the first and second wavelength subsets.

17. The device of claim 1, further comprising a plurality of birefringent waveplates arranged such that a first signal comprising a first subset of wavelengths having a first polarization and a second signal comprising a second subset of wavelengths having a second polarization are processed by the first and second birefringent crystals, the polarization rotator, and the birefringent waveplates into a third signal comprising the first and second subsets of wavelengths.

18. The device of claim 8, wherein at least one of the plurality of polarization rotators arranged among the birefringent waveplates comprises a dynamic half-wave plate operable to change the polarization state of beam components associated with the optical signal.

19. The device of claim 18, wherein the dynamic half-wave plate changes the polarization state of the beam components such that the first polarization of the first subset of wavelengths is substantially orthogonal to the second polarization of the second subset of wavelengths.

20. The device of claim 18, wherein the dynamic half-wave plate changes the polarization state of the beam components such that the first polarization of the first subset of wavelengths is substantially equal to the second polarization of the second subset of wavelengths.

21. The device of claim 19, further comprising a polarization based routing waveplate operable to route the first subset of wavelengths for receipt by a first output port and the second subset of wavelengths for receipt by a second output port.

22. The device of claim 20, further comprising a polarization based routing waveplate operable to route the first subset of wavelengths and the second subset of wavelengths for receipt by an output port.

23. A method for adjusting the effective optical path length of an optical signal, comprising:
propagating an optical signal through a first birefringent crystal having a first length;
propagating the optical signal through a second birefringent crystal having a second length;
rotating the polarization of beam components associated with the optical signal such that the effective optical path length of the optical signal is based, at least in part, upon the first length of the first birefringent crystal and the second length of the second birefringent crystal.

24. The method of claim 23, wherein rotating comprises rotating the polarization of the beam components by approximately ninety degrees such that the effective optical path length of the optical signal is based, at least in part, upon the difference between the first length of the first birefringent crystal and the second length of the second birefringent crystal.

25. The method of claim 23, wherein rotating comprises rotating the polarization of the beam components by either approximately zero degrees or approximately three-hundred-sixty degrees such that the effective optical path length of the optical signal is based, at least in part, upon the addition of the first length of the first birefringent crystal and the second length of the second birefringent crystal.

26. The method of claim 23, wherein the first length of the first birefringent crystal is substantially equal to the second length of the second birefringent crystal.

27. The method of claim 23, wherein the first length of the first birefringent crystal is not substantially equal to the second length of the second birefringent crystal.

28. The method of claim 23, further comprising propagating the optical signal through a plurality of birefringent waveplates such that the optical signal is processed into a first subset of wavelengths having a first polarization and a second subset of wavelengths having a second polarization.

29. The method of claim 28, wherein the first subset of wavelengths and the second subset of wavelengths each comprise a plurality of wavelength channels, each wavelength channel having a particular bandwidth, such that:
if the step of rotating comprises rotating the polarization of beam components by approximately ninety degrees, then each wavelength channel has a first bandwidth; and
if the step of rotating comprises rotating the polarization of beam components by either approximately zero degrees or approximately three-hundred-sixty degrees, then each wavelength channel has a second bandwidth that is narrower than the first bandwidth.

30. The method of claim 28, wherein the plurality of birefringent waveplates are oriented at a common angle about an optical axis.

31. The method of claim 30, further comprising imparting a phase delay between a first polarization component of the optical signal and a second polarization component of the optical signal using at least one of the plurality of birefringent waveplates.

32. The method of claim 31, further comprising rotating the polarization of at least one of the first polarization component and the second polarization component using one of a plurality of polarization rotators arranged among the plurality of birefringent waveplates.

33. The method of claim 32, wherein:

a first polarization rotator arranged among the birefringent waveplates is oriented at a first angle about the optical axis; and a second polarization rotator arranged among the birefringent waveplates is oriented at a second angle about the optical axis.

34. The method of claim 33, wherein the first and second subsets of wavelengths are based, at least in part, upon the first angle of the first polarization rotator and the second angle of the second polarization rotator.

35. The method of claim 30, wherein the first and second subsets of wavelengths are based, at least in part, upon the common angle of the plurality of birefringent waveplates.

36. The method of claim 30, wherein the common angle of the plurality of birefringent waveplates is approximately zero degrees.

37. The method of claim 28, wherein the first subset of wavelengths is approximately complementary to the second subset of wavelengths.

38. The method of claim 33, wherein adjusting at least one of the first angle of the first polarization rotator and the second angle of the second polarization rotator adjusts the first and second wavelength subsets.

39. The method of claim 30, further comprising rotating the polarization of beam components associated with the optical signal using one of a plurality of polarization rotators arranged among the plurality of birefringent waveplates such that the first polarization of the first subset of wavelengths is substantially orthogonal to the second polarization of the second subset of wavelengths.

40. The method of claim 30, further comprising rotating the polarization of beam components associated with the optical signal using one of a plurality of polarization rotators arranged among the plurality of birefringent waveplates such that the first polarization of the first subset of wavelengths is substantially equal to the second polarization of the second subset of wavelengths.

41. The method of claim 39, further comprising routing the first subset of wavelengths for receipt by a first output port and the second subset of wavelengths for receipt by a second output port.

42. The method of claim 40, further comprising routing the first subset of wavelengths and the second subset of wavelengths for receipt by an output port.

43. An optical wavelength router, comprising:

a first input port operable to receive a first input signal having a first bit-rate;

a second input port operable to receive a second input signal having a second bit-rate; and an optical device comprising:

a first birefringent crystal having a first length;

a second birefringent crystal having a second length, wherein an optical signal propagating through the first and second birefringent crystals has an effective optical path length based, at least in part, upon the first length of the first birefringent crystal and the second length of the second birefringent crystal; and a dynamic polarization rotator operable to adjust the effective optical path length of the optical signal in response to a control signal such that the optical device operates in the first state to process the first input signal and the optical device operates in the second state to process the second input signal.

44. The router of claim 43, wherein the first bit-rate is different from the second bit-rate.

45. The router of claim 43, wherein:

the first input signal comprises a plurality of wavelength channels, each wavelength channel having a first spectral bandwidth;

the second input signal comprises a plurality of wavelength channels, each wavelength channel having a second spectral bandwidth different from the first spectral bandwidth.

46. The router of claim 43, further comprising:

a demultiplexer operable to demultiplex the first input signal into a plurality of wavelength channels; and a switch operable to process the plurality of wavelength channels associated with the first input signal.

47. The router of claim 46, wherein the optical device further comprises a plurality of birefringent waveplates operable to multiplex the plurality of wavelength channels associated with the first input signal to form an output signal.

48. The router of claim 47, wherein the birefringent waveplates are oriented at a substantially common angle about an optical axis and further comprising a plurality of polarization rotators arranged among the plurality of birefringent waveplates.

49. The router of claim 43, wherein the dynamic polarization rotator is operable to change the polarization state of at least a portion of the first input signal by approximately ninety degrees such that the effective optical path length of the first input signal is based, at least in part, upon the difference between the first length of the first birefringent crystal and the second length of the second birefringent crystal.

50. The router of claim 43, wherein the dynamic polarization rotator is operable to change the polarization state of at least a portion of the first input signal by either approximately zero degrees or approximately three-hundred-sixty degrees such that the effective optical path length of the first input signal is based, at least in part, upon the addition of the first length of the first birefringent crystal and the second length of the second birefringent crystal.

* * * * *